US009754728B2

(12) United States Patent
Inoue et al.

(10) Patent No.: US 9,754,728 B2
(45) Date of Patent: Sep. 5, 2017

(54) MATERIAL FOR ELECTRODE OF POWER STORAGE DEVICE, POWER STORAGE DEVICE, AND ELECTRICAL APPLIANCE

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Ryota Tajima, Kanagawa (JP); Tamae Moriwaka, Kanagawa (JP); Junpei Momo, Kanagawa (JP); Teppei Oguni, Kanagawa (JP); Kai Kimura, Kanagawa (JP); Kazutaka Kuriki, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 514 days.

(21) Appl. No.: 14/032,214

(22) Filed: Sep. 20, 2013

(65) Prior Publication Data
US 2014/0099554 A1 Apr. 10, 2014

(30) Foreign Application Priority Data

Oct. 9, 2012 (JP) ................... 2012-224581

(51) Int. Cl.
*H01M 4/133* (2010.01)
*H01G 9/042* (2006.01)
(Continued)

(52) U.S. Cl.
CPC ............. *H01G 9/042* (2013.01); *H01G 11/06* (2013.01); *H01G 11/26* (2013.01); *H01G 11/50* (2013.01);
(Continued)

(58) Field of Classification Search
CPC .............................. H01M 4/133; H01M 4/366
See application file for complete search history.

(56) References Cited

U.S. PATENT DOCUMENTS 6,218,050 B1 4/2001 Yoon et al.
6,465,127 B1 10/2002 Shin
(Continued)

FOREIGN PATENT DOCUMENTS

CN 101188287 A 5/2008
CN 101533929 A 9/2009
(Continued)

OTHER PUBLICATIONS

Jung.Y et al., "Ultrathin Direct Atomic Layer Deposition on Composite Electrodes for Highly Durable and Safe Li-Ion Batteries,", Adv. Mater. (Advanced Materials), May 18, 2010, vol. 22, No. 19, pp. 2172-2176.
(Continued)

*Primary Examiner* — Jonathan Jelsma
(74) *Attorney, Agent, or Firm* — Nixon Peabody LLP; Jeffrey L. Costellia

(57) ABSTRACT

To improve the reliability of a power storage device. A granular active material including carbon is used, and a net-like structure is formed on part of a surface of the granular active material. In the net-like structure, a carbon atom included in the granular active material is bonded to a silicon atom or a metal atom through an oxygen atom. Formation of the net-like structure suppresses reductive decomposition of an electrolyte solution, leading to a reduction in irreversible capacity. A power storage device using the above active material has high cycle performance and high reliability.

16 Claims, 18 Drawing Sheets

(51) Int. Cl.
*H01M 4/36* (2006.01)
*H01M 4/02* (2006.01)
*H01M 4/134* (2010.01)
*H01G 11/06* (2013.01)
*H01G 11/26* (2013.01)
*H01G 11/50* (2013.01)
*H01M 10/0525* (2010.01)

(52) U.S. Cl.
CPC ............ *H01M 4/02* (2013.01); *H01M 4/133* (2013.01); *H01M 4/134* (2013.01); *H01M 4/366* (2013.01); *H01M 10/0525* (2013.01); *Y02E 60/122* (2013.01); *Y02E 60/13* (2013.01)

(56) References Cited

U.S. PATENT DOCUMENTS

| | | | |
|---|---|---|---|
| 6,641,955 | B1 | 11/2003 | Matsubara et al. |
| 7,745,047 | B2 | 6/2010 | Zhamu et al. |
| 8,835,049 | B2 | 9/2014 | Yew et al. |
| 2007/0099085 | A1* | 5/2007 | Choi ............ H01M 4/13 429/231.95 |
| 2008/0118834 | A1 | 5/2008 | Yew et al. |
| 2009/0029245 | A1 | 1/2009 | Ibaragi et al. |
| 2009/0092892 | A1 | 4/2009 | Yamaguchi et al. |
| 2009/0098458 | A1 | 4/2009 | Fujii et al. |
| 2009/0117467 | A1* | 5/2009 | Zhamu .............. H01M 4/133 429/231.8 |
| 2009/0214958 | A1 | 8/2009 | Park |
| 2009/0226819 | A1* | 9/2009 | Ihara ................ H01M 4/366 429/331 |
| 2010/0310908 | A1 | 12/2010 | Zhang et al. |
| 2011/0097627 | A1 | 4/2011 | Watanabe et al. |
| 2011/0250506 | A1 | 10/2011 | Koshina |
| 2012/0064409 | A1 | 3/2012 | Zhamu et al. |
| 2013/0052528 | A1 | 2/2013 | Kuriki et al. |
| 2013/0266858 | A1 | 10/2013 | Inoue et al. |
| 2014/0087251 | A1 | 3/2014 | Takahashi et al. |

FOREIGN PATENT DOCUMENTS

| | | |
|---|---|---|
| CN | 101849302 A | 9/2010 |
| EP | 1926163 | 5/2008 |
| JP | 11-096993 A | 4/1999 |
| JP | 11-096995 A | 4/1999 |
| JP | 11-329435 | 11/1999 |
| JP | 2002-008657 A | 1/2002 |
| JP | 2002-352801 A | 12/2002 |
| JP | 2004-014381 A | 1/2004 |
| JP | 2005-302510 A | 10/2005 |
| JP | 2005-332769 A | 12/2005 |
| JP | 2008-130570 | 6/2008 |
| JP | 2010-015895 A | 1/2010 |
| WO | WO-2009/061685 | 5/2009 |

OTHER PUBLICATIONS

Chinese Office Action (Application No. 201310467411.7) dated Oct. 18, 2016.

* cited by examiner

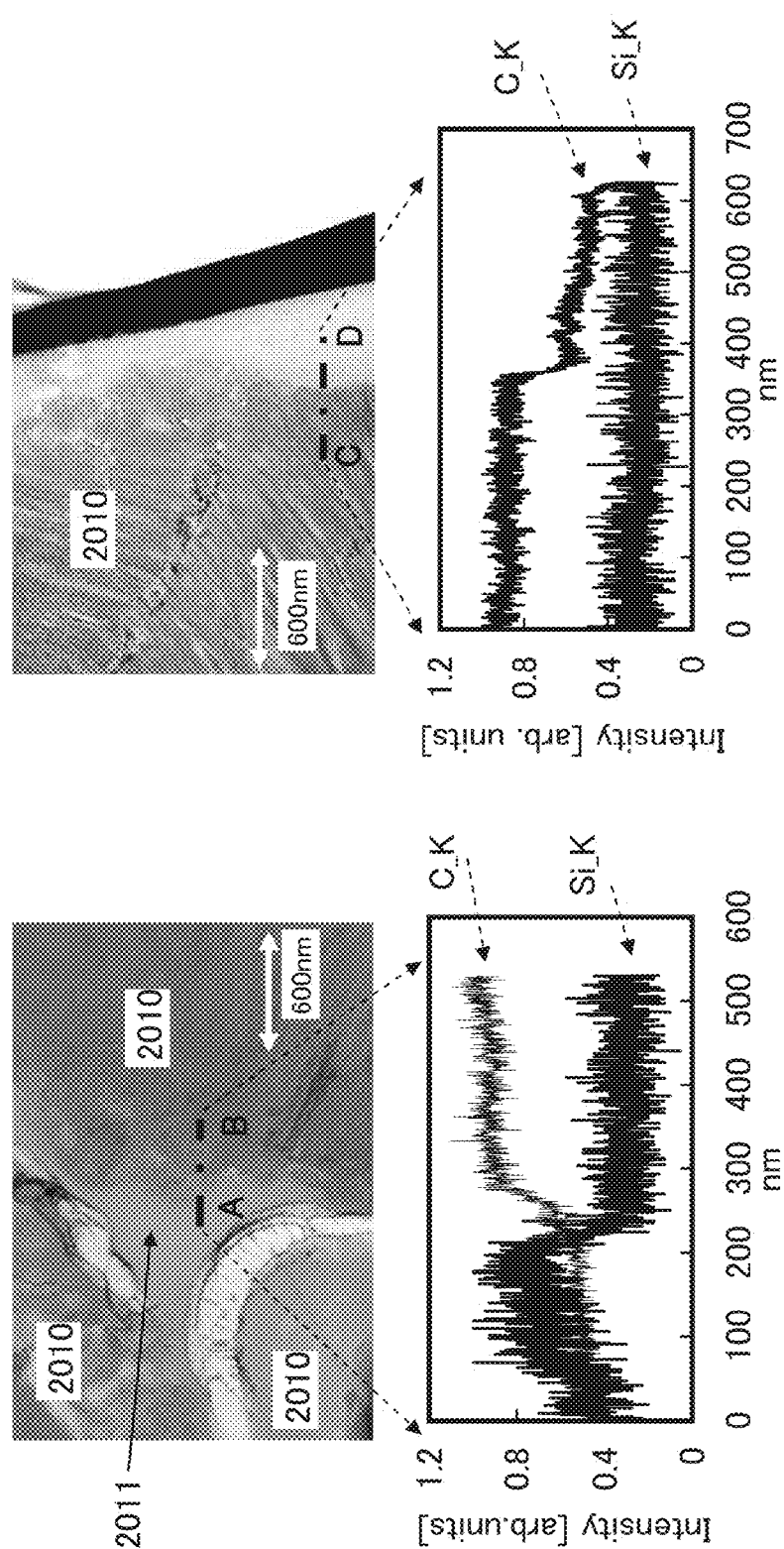

MATERIAL FOR ELECTRODE OF POWER STORAGE DEVICE, POWER STORAGE DEVICE, AND ELECTRICAL APPLIANCE

BACKGROUND OF THE INVENTION

1. Field of the Invention

The present invention relates to a material for an electrode of a power storage device, a power storage device, and an electrical appliance.

2. Description of the Related Art

In recent years, a variety of power storage devices, for example, non-aqueous secondary batteries such as lithium ion batteries (LIBs), lithium ion capacitors (LICs), and air cells have been actively developed. In particular, demand for lithium ion batteries with high output and high energy density has rapidly grown with the development of the semiconductor industry, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium ion batteries are essential for today's information society as rechargeable energy supply sources.

A negative electrode of the power storage devices such as the lithium ion batteries and the lithium ion capacitors includes at least a negative electrode current collector and a negative electrode active material layer provided on a surface of the negative electrode current collector. The negative electrode active material layer contains a negative electrode active material such as carbon or silicon, which can store and release lithium ions serving as carrier ions.

A negative electrode of a lithium ion battery using a graphite-based carbon material is formed by mixing graphite (black lead) that is a negative electrode active material, acetylene black (AB) as a conductive additive, and polyvinylidene fluoride (PVDF) that is a resin as a binder to form slurry, applying the slurry over a negative electrode current collector, and drying the slurry, for example.

A lithium ion battery or a lithium ion capacitor has a problem in that irreversible capacity caused by repetitive insertion/extraction of lithium ions into/from the negative electrode active material is generated.

A negative electrode of a lithium ion battery or a lithium ion capacitor has an extremely low electrode potential and a high reducing ability. Accordingly, an electrolyte solution containing an organic solvent is reduced and decomposed, and decomposed matters form a film on a surface of the negative electrode. The formation of the film generates irreversible capacity, so that part of discharge capacity is lost.

As a technique for reducing the loss of discharge capacity, for example, a technique in which a surface of a negative electrode active material is covered with a metal oxide film, a silicon oxide film, or the like has been known (e.g., Patent Document 1). The formation of the above oxide film on the surface of the negative electrode active material can suppress formation of the film formed on the surface of the negative electrode due to the decomposition, and thus can reduce irreversible capacity.

REFERENCE

Patent Document

[Patent Document 1] Japanese Published Patent Application No. H11-329435

SUMMARY OF THE INVENTION

However, capacity loss cannot be reduced sufficiently in conventional power storage devices.

For example, in the case of using a carbon-based material as a negative electrode active material, the cause of generation of irreversible capacity is not only the film formed on the surface of the negative electrode due to the decomposition, but can be, for example, a functional group or a dangling bond at an end of the negative electrode active material. The functional group or the dangling bond is unstable and a structure of the carbon-based material is readily changed, so that irreversible capacity is likely to be formed.

A functional group or a dangling bond exists even when a surface of a negative electrode active material is covered with an oxide film as in, for example, Patent Document 1. Therefore, the capacity loss cannot be reduced sufficiently only by the conventional method of covering a surface of a negative electrode active material with an oxide film.

The above problems exist not only in lithium ion batteries but also in lithium ion capacitors.

An object of one embodiment of the present invention is to reduce irreversible capacity of a power storage device.

An object of one embodiment of the present invention is to reduce the number of functional groups or dangling bonds at an end of a material serving as an active material.

Another object of one embodiment of the present invention is to improve the reliability of a power storage device.

In one embodiment of the present invention, a granular active material including carbon is used, and a net-like structure is formed on part of a surface of the granular active material. The net-like structure is formed by a plurality of bonds between a carbon atom included in the granular active material and a silicon atom or a metal atom through an oxygen atom. Formation of the net-like structure suppresses reductive decomposition of an electrolyte solution, leading to a reduction in irreversible capacity. Furthermore, the number of functional groups or dangling bonds existing on the surface of the granular active material is reduced in order to reduce irreversible capacity.

One embodiment of the present invention is a material for an electrode of a power storage device, which includes a granular active material and has a net-like structure on part of a surface of the granular active material. The net-like structure is formed by a plurality of bonds between a carbon atom included in the granular active material and a silicon atom or a metal atom through an oxygen atom.

In the above embodiment of the present invention, for example, in the case where the granular active material is a graphite particle including a plurality of graphene layers, a net-like structure may be provided across ends of the plurality of graphene layers on part of the surface of the granular active material. Thus, a change in structure, such as separation of graphene layers by insertion/extraction of carrier ions into/from graphite particles, is suppressed.

In the above embodiment of the present invention, n (n is a natural number) oxide layers each including a bond of the silicon atom or the metal atom and the oxygen atom may be provided over the net-like structure.

Another embodiment of the present invention is a power storage device in which a negative electrode active material layer of a negative electrode includes the above material for an electrode of a power storage device.

Another embodiment of the present invention is an electrical appliance including the above power storage device.

In one embodiment of the present invention, irreversible capacity can be reduced, and thus, loss of discharge capacity can be reduced. Furthermore, the number of functional groups or dangling bonds at an end of a material serving as an active material can be reduced. Moreover, the reliability of a power storage device can be improved.

BRIEF DESCRIPTION OF THE DRAWINGS

FIGS. 15A and 15B show images observed with STEM and results of EDX.

DETAILED DESCRIPTION OF THE INVENTION

Embodiments of the present invention will be described below. Note that it will be readily appreciated by those skilled in the art that contents of the embodiments can be modified without departing from the spirit and scope of the present invention. Thus, the present invention should not be limited to, for example, the description of the following embodiments.

Note that the contents in different embodiments can be combined with one another as appropriate. In addition, the contents in different embodiments can be replaced with one another as appropriate.

The ordinal numbers such as "first" and "second" are used to avoid confusion between components and do not limit the number of each component.

(Embodiment 1)

In this embodiment, an example of a material for an electrode of a power storage device will be described.

<Structural Example of Electrode Material of Power Storage Device>

First, a structural example of a material for an electrode of a power storage device of this embodiment will be described with reference to FIGS. 1A and 1B, FIGS. 2A and 2B, and FIG. 3.

Figure 1A:
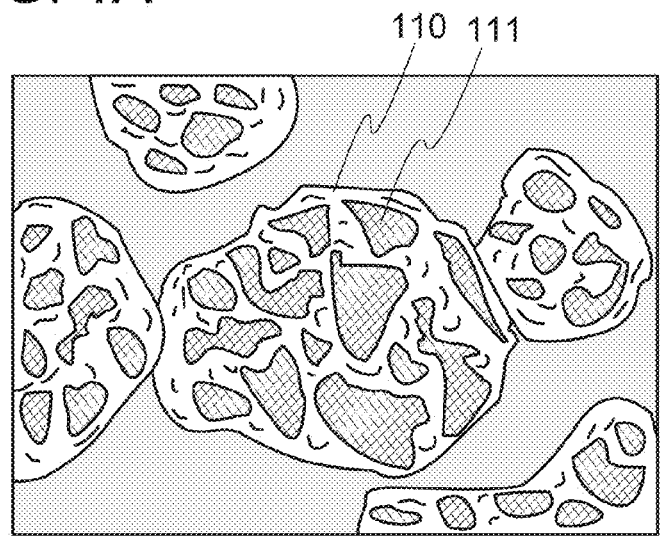
FIGS. 1A and 1B illustrate an example of a material for an electrode of a power storage device.

The material for an electrode of a power storage device includes a granular active material 110 as illustrated in FIG. 1A.

The shape of the granular active material 110 is not particularly limited. The granular active material 110 may have a spherical shape (powdered state), a plate-like shape, an angular shape, a column shape, a needle-like shape, or a scale-like shape, for example. Note that a film-like active material may be used instead of the granular active material 110.

As a material of the granular active material 110, a carbon-based material (e.g., graphite) can be used.

Graphite is a layered compound in which a plurality of graphene layers is stacked in parallel to each other by van der Waals forces. The graphene layer is a sheet composed of a hexagonal net pattern of a one-atom thick layer of carbon formed by carbon atoms which are covalently bonded to each other to form $sp^2$ hybrid orbitals and tricoordinate with each other at an angle of 120° in a surface. Note that the graphene layer may partly include defects or functional groups.

Examples of graphite include low crystalline carbon such as soft carbon and hard carbon and high crystalline carbon such as natural graphite, kish graphite, pyrolytic graphite, mesophase pitch based carbon fiber, meso-carbon microbeads, mesophase pitches, petroleum-based or coal-based coke, and the like.

The particle diameter of the granular active material 110 is not particularly limited, and may be greater than or equal to 6 μm and less than or equal to 30 μm, for example.

Figure 1B:
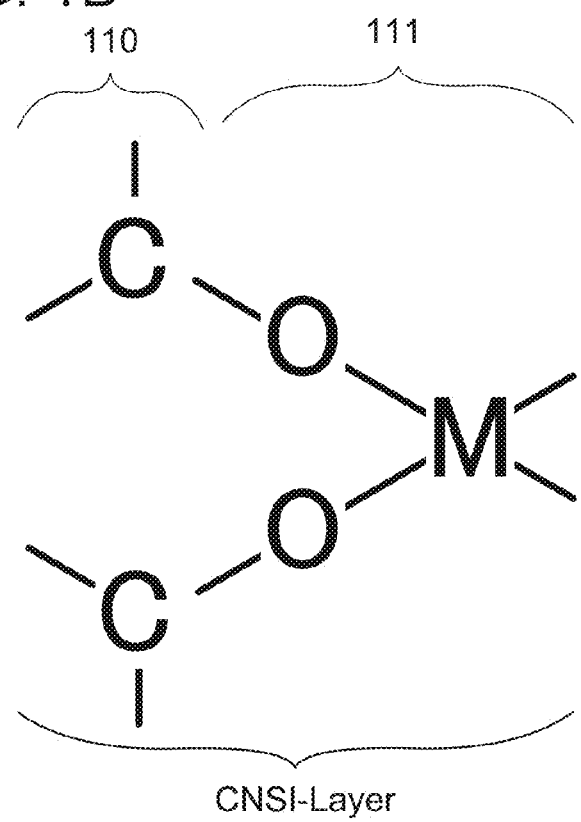

A net-like structure of C—O—M bonds illustrated in FIG. 1B is formed on part of a surface of the granular active material 110. The C—O—M bond is a bond where a plurality of carbon atoms included in the granular active material 110 is bonded to a silicon atom or a metal atom through an oxygen atom. C represents a carbon atom included in the granular active material 110, O represents an oxygen atom, and M represents, for example, a niobium atom, a titanium atom, a vanadium atom, a tantalum atom, a tungsten atom, a zirconium atom, a molybdenum atom, a hafnium atom, a chromium atom, an aluminum atom, or a silicon atom.

It is preferable that the net-like structure do not have electron conductivity. Furthermore, it is preferable that the net-like structure have a function of allowing passage of a carrier ion of a power storage device. Note that examples of the carrier ion include a lithium ion that is used for a lithium ion battery or a lithium ion capacitor; an alkali metal ion (e.g., a sodium ion or a potassium ion); an alkaline earth metal ion (e.g., a calcium ion, a strontium ion, or a barium ion, a beryllium ion, or a magnesium ion).

The net-like structure is preferably formed not on the entire surface of the granular active material 110 but on part of the surface of the granular active material 110. In the case where a plurality of granular active materials 110 is in contact with each other as illustrated in FIG. 1A, the net-like structure is preferably formed in a region other than the contact portions. The net-like structure covers not the entire surface of the granular active material 110, so that cell reaction is possible and the decomposition reaction of an electrolyte solution can be suppressed.

The net-like structure illustrated in FIG. 1B is referred to as a chemical network structured interface (CNSI) layer.

The CNSI layer is a three-dimensional net-like structure that is formed by chemical bonds of carbon included in the granular active material and an oxide of metal, silicon, or the like.

The CNSI layer can make a surface of the granular active material stable as compared with a film formed on an electrode surface due to decomposition of an electrolyte solution. Thus, the CNSI layer functions as a protection layer. The CNSI layer is dense and has good adhesion to the granular active material. For this reason, providing the CNSI layer can reduce an area of the granular active material in direct contact with an electrolyte solution, suppress the decomposition of the electrolyte solution in a power storage device, and reduce irreversible capacity that causes a decrease in the initial capacity of the power storage device.

Note that n (n is a natural number) oxide layers each including a M-O bond formed of M and O may be provided over the net-like structure. In such a case, O in the oxide layer that is adjacent to the CNSI layer bonds to M in the CNSI layer. Since the same oxide is used for the CNSI layer and the oxide layer, a connection between the CNSI layer and the oxide layer is stable.

The net-like structure can be formed, for example, in such a manner that a coating film 111 (a film formed of an oxide including O and M) is formed on part of the surface of the granular active material 110 as illustrated in FIG. 1A, and carbon included in the granular active material 110 is bonded to an oxide included in the coating film 111. In that case, an oxygen atom included in the coating film 111 is represented by O, and a metal atom or a silicon atom included in the coating film 111 is represented by M.

The coating film of one embodiment of the present invention is an artificial film provided in advance before a power storage device is charged and discharged, and is clearly distinguished from a film formed due to the decomposition reaction between an electrolytic solution and an active material in this specification and the like.

Figure 2A:
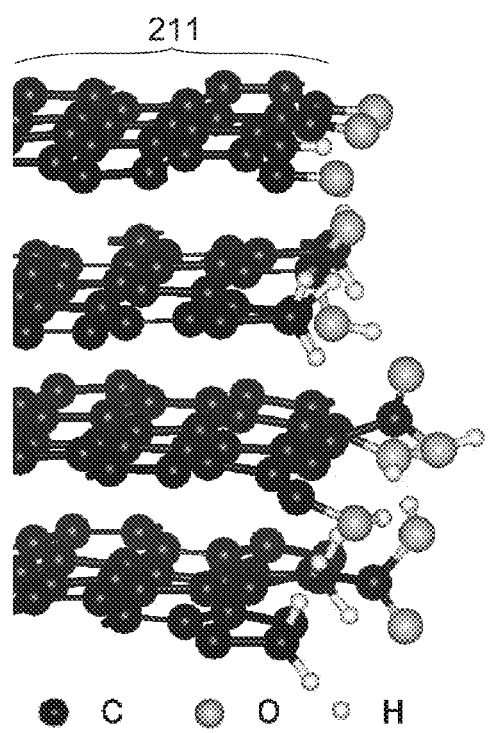
FIGS. 2A and 2B illustrate an example of a material for an electrode of a power storage device.
Figure 2B:
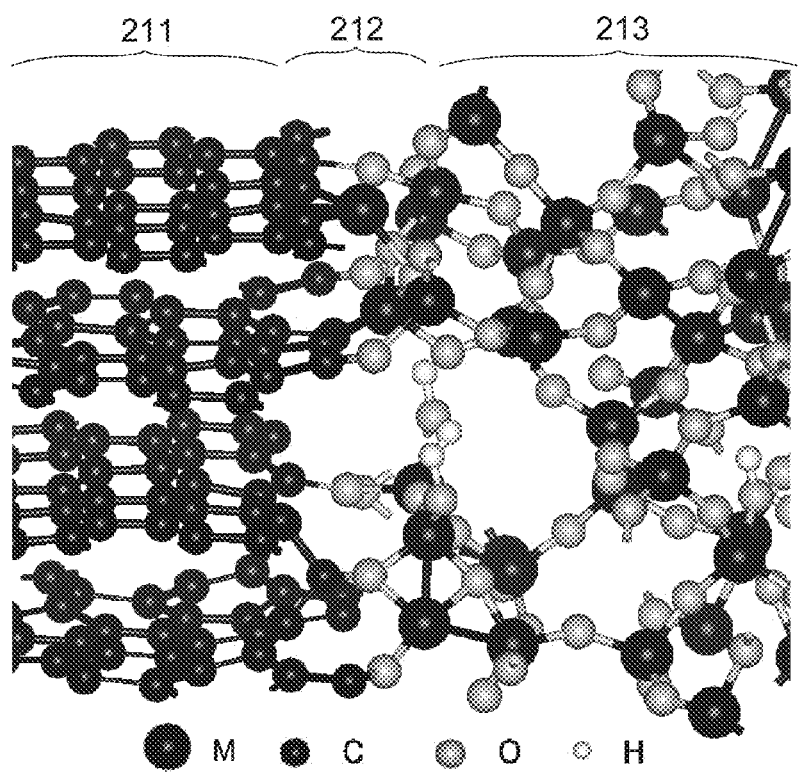

A structural example of the material for an electrode of a power storage device, which includes the CNSI layer, will be described with reference to FIGS. 2A and 2B. Here, description is made on a case of forming the net-like structure in such a manner that a coating film (a film formed of an oxide including a metal atom or a silicon atom) is formed on graphite particles, and carbon included in the graphite particles is bonded to an oxide included in the coating film. FIG. 2A is a schematic view of graphite particles used for the net-like structure. FIG. 2B is a schematic view illustrating the case of forming the net-like structure using the graphite particles in FIG. 2A. Note that in FIGS. 2A and 2B, a relatively small black sphere represents a carbon (C) atom, a relatively large black sphere represents a metal or silicon (M) atom, a gray sphere represents an oxygen (O) atom, and a white sphere represents a hydrogen (H) atom. Note that for convenience, the size of the spheres may be different from the actual size of the atoms.

As illustrated in FIG. 2A, a graphite particle 211 is composed of a plurality of graphene layers, and a dangling bond or a functional group such as an OH group or a COOH group exists at an end of the graphene layer. At this time, an end of the graphite particle 211 is unstable. Accordingly, when the graphite particle 211 is used for a power storage device, decomposition of an electrolyte solution and separation of graphene layers due to insertion and extraction of carrier ions are likely to occur.

When a coating film (a film of an oxide) is formed over the graphite particle 211 illustrated in FIG. 2A and carbon included in the graphite particle is bonded to an oxide included in the coating film, dangling bonds or functional groups at ends of the plurality of graphene layers react with oxides as illustrated in FIG. 2B.

At this time, bond portions of oxides and carbon atoms at the ends of the plurality of graphene layers on part of a surface of the graphite particle 211 (on part of the surface of the granular active material 110) correspond to a net-like structure 212 formed of C—O-M bonds. In other words, the net-like structure 212 is three-dimensionally formed across ends of the plurality of graphene layers on the surface of the granular active material 110. With the net-like structure 212 formed across ends of the plurality of graphene layers, separations of graphene layers due to insertion and extraction of carrier ions can be prevented; therefore, a change in the structure of the graphite particle 211 can be prevented.

Moreover, n oxide layers 213 are formed over the net-like structure 212. Note that the oxide layer 213 may be extended to the surface of the graphite particle 211 positioned in a portion other than the ends of the plurality of graphene layers.

Figure 3:
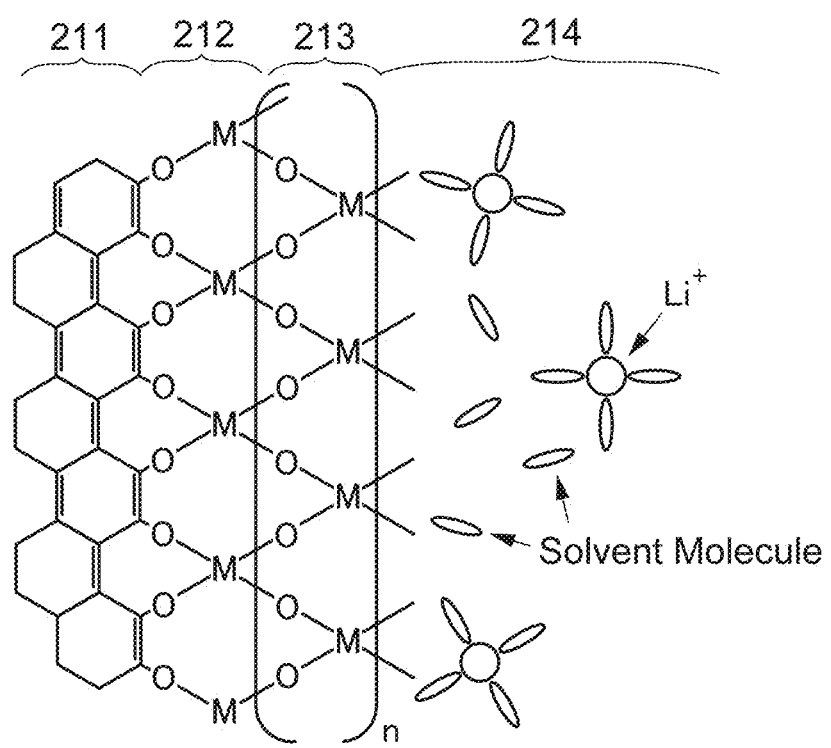
FIG. 3 illustrates an example of a material for an electrode of a power storage device.

FIG. 3 is a schematic diagram illustrating the case where the electrode material illustrated in FIG. 2B is in contact with an electrolyte solution. As illustrated in FIG. 3, when the three-dimensional net-like structure 212 formed of C—O-M bonds and the oxide layer 213 are provided between the graphite particle 211 and an electrolyte solution 214 including a molecule containing lithium, an area of the graphite particle 211 in direct contact with the electrolyte solution 214 is reduced, so that decomposition of the electrolyte solution 214 is suppressed. Moreover, a film due to the decomposition of the electrolyte solution is less likely to be formed on the surface of the graphite particle 211 including the net-like structure 212.

As described above with reference to FIGS. 1A and 1B, FIGS. 2A and 2B, and FIG. 3, in the material for an electrode of a power storage of this embodiment, the net-like structure formed of C—O-M bonds is provided on part of the surface of the granular active material, so that the surface of the granular active material is stabilized. Thus, decomposition of the electrolyte solution can be suppressed.

<Method of Producing Electrode Material of Power Storage Device>

Next, as an example of a method for producing the material for an electrode of a power storage device that includes the net-like structure, a method for producing the material for an electrode of a power storage device illustrated in FIG. 1A will be described with reference to FIGS. 4A and 4B. Here, a producing method using a sol-gel method and a producing method using a polysilazane method will be described as examples.

[Method of Producing Electrode Material of Power Storage Device Using Sol-Gel Method]

Figure 4A:
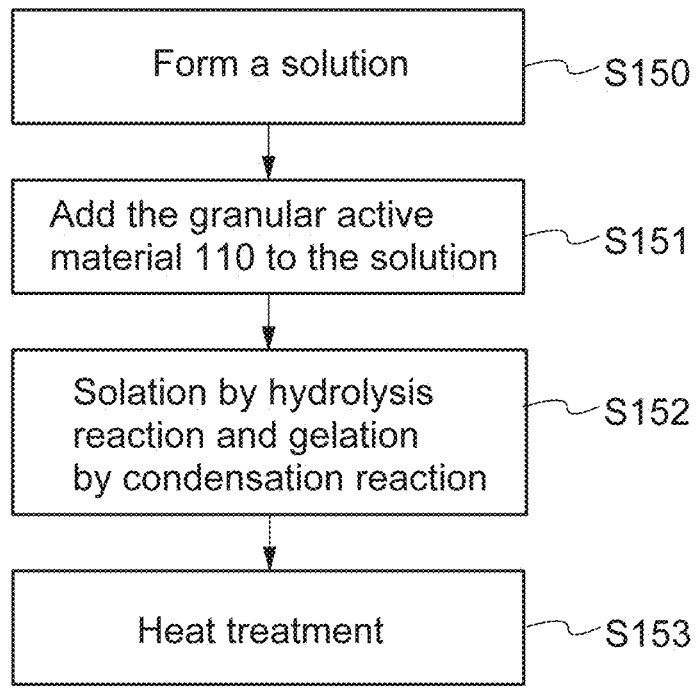
FIGS. 4A and 4B are each a flow chart of a method for producing a material for an electrode of a power storage device.

At Step S150 in FIG. 4A, metal alkoxide or silicon alkoxide and a stabilizing agent are added to a solvent, and the mixture is stirred to form a solution.

As the solvent, toluene can be used, for example.

As the stabilizing agent, ethyl acetoacetate can be used, for example.

When a silicon oxide film is formed as the coating film 111, for example, silicon ethoxide, silicon methoxide, or the like can be used as alkoxide.

Next, at Step S151, the granular active material 110 is added to the solution, and the mixture is stirred. Thus, the solution becomes a thick paste and the surface of the granular active material 110 is covered with the alkoxide.

At Step S152, the alkoxide on the surface of the granular active material 110 is turned into a gel by a sol-gel method.

At Step S152, a small amount of water is added to the solution including the granular active material 110 so that the alkoxide reacts with water, whereby a sol-state decomposition product is formed. Here, the term "a sol state" refers to a state where solid fine particles are substantially uniformly dispersed in a liquid. Note that the small amount of water may be added to the solution including the active material by exposing the solution to the air. For example, in the case where silicon ethoxide ($Si(OEt)_4$) is used as the alkoxide, hydrolysis reaction is expressed by Formula 1.

$$Si(OEt)_4 + 4H_2O \rightarrow Si(OEt)_{4-x}(OH)_x + xEtOH \text{ (}x\text{ is an integer of 4 or less)} \quad \text{(Formula 1)}$$

Next, the sol-state decomposition product is dehydrated and condensed to be a reactant which is a gel. Here, "being a gel" refers to being in a state where a three-dimensional network structure is developed due to attractive interaction between solid fine particles and the decomposition product is solidified. In the case where silicon ethoxide ($Si(OEt)_4$) is used as the alkoxide, the condensation reaction is expressed by Formula 2.

$$2Si(OEt)_{4-x}(OH)_x \rightarrow (OEt)_{4-x}(OH)_{x-1}Si\text{—}O\text{—}Si(OH)_{x-1}(OEt)_{4-x} + H_2O \text{ (}x\text{ is an integer of 4 or less)} \quad \text{(Formula 2)}$$

When silicon ethoxide is used as the alkoxide and a graphite particle is used as the granular active material 110, condensation reaction of hydrate of silicon ethoxide occurs, whereby the net-like structure formed of C—O-M bonds is formed at an end of the granular active material 110. For example, when carbon in the granular active material 110 is represented by C, a functional group is represented by OH or COOH, and the granular active material 110 including the functional group is represented by C—OH or C—COOH, condensation reaction is expressed by Formula 3 or Formula 4.

$$Si(OEt)_{4-x}(OH)_x + C\text{—}OH \rightarrow C\text{—}O\text{—}Si(OEt)_{4-x}(OH)_{x-1} + H_2O \text{ (}x\text{ is an integer of 4 or less)} \quad \text{(Formula 3)}$$

$$Si(OEt)_{4-x}(OH)_x + C\text{—}COOH \rightarrow C\text{—}CO\text{—}O\text{—}Si(OEt)_{4-x}(OH)_{x-1} + H_2O \text{ (}x\text{ is an integer of 4 or less)} \quad \text{(Formula 4)}$$

The condensation reaction is determined by the kind of hydrate of silicon ethoxide and the number of functional groups at ends of the granular active material 110. Note that in the case where an end of the granular active material 110 has a dangling bond, carbon having a dangling bond bonds to the above oxide; thus, a C—O-M bond is formed.

Through these steps, the net-like structure formed of C—O-M bonds can be formed on part of the surface of the granular active material 110.

After that, heat treatment is performed under atmospheric pressure at Step S153, whereby the material for an electrode of a power storage device can be produced. The temperature of the heat treatment is higher than or equal to 300° C. and lower than or equal to 900° C., preferably higher than or equal to 500° C. and lower than or equal to 800° C.

By the producing method using a sol-gel method shown in FIG. 4A, the electrode material in which the net-like structure formed of C—O-M bonds is formed on part of the surface of the granular active material can be produced.

[Method of Producing Electrode Material of Power Storage Device Using Polysilazane Method]

At Step S160, a stabilizing agent is added to a solvent, and the mixture is stirred to form a solution.

As the solvent, toluene can be used, for example.

As the stabilizing agent, ethyl acetoacetate can be used, for example.

In the case where, for example, a silicon oxide film is formed as the coating film 111, at Step S161, the granular active material 110 and a polysilazane-containing solution which contains perhydropolysilazane are added to the above solution, and the mixture is stirred. Thus, the solution becomes a thick paste.

Next, at Step S162, the sample is kept in the air, and heat treatment is performed at Step S163 so that inversion of perhydropolysilazane is performed. Note that the heat treatment temperature is higher than or equal to 30° C. and lower than or equal to 600° C., preferably higher than or equal to 100° C. and lower than or equal to 200° C. The heat treatment is not necessarily performed. For example, the inversion of perhydropolysilazane can be performed by keeping the sample at temperature higher than or equal to 15° C. and lower than 30° C. for a certain period of time. When perhydropolysilazane is $SiH_2NH$, the inversion reaction is expressed by Formula 5.

$$SiH_2NH + 2H_2O \rightarrow SiO_2 + NH_3 + 2H_2 \quad \text{(Formula 5)}$$

At this time, a compound including Si(OH) is generated as a by-product. This compound reacts with a functional group at the end of the granular active material 110, whereby the net-like structure formed of C—O-M bonds is formed. For example, when carbon in the granular active material 110 is represented by C, a functional group is represented by OH or COOH, and the granular active material 110 including the functional group is represented by C—OH or C—COOH, the generation reaction is expressed by Formula 6 and Formula 7.

$$Si(OH) + C\text{—}OH \rightarrow C\text{—}O\text{—}Si\text{—} + H_2O \quad \text{(Formula 6)}$$

$$Si(OH) + C\text{—}COOH \rightarrow C\text{—}CO\text{—}O\text{—}Si\text{—} + H_2O \quad \text{(Formula 7)}$$

Through these steps, the net-like structure formed of C—O-M bonds can be formed on part of the surface of the granular active material 110.

Figure 4B:
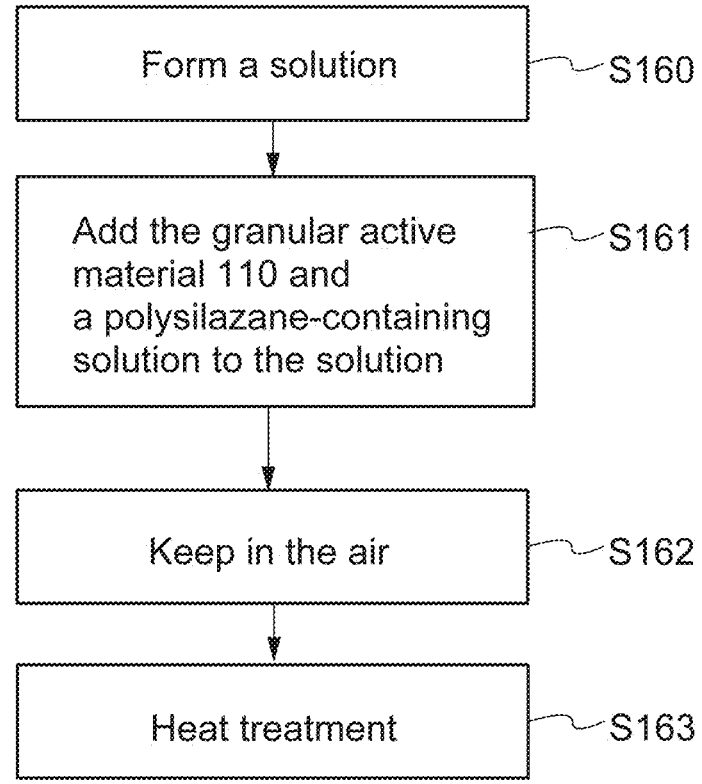

By the producing method using a polysilazane method shown in FIG. 4B, the electrode material in which the net-like structure formed of C—O-M bonds is formed on part of the surface of the granular active material can be produced.

(Embodiment 2)

In this embodiment, a negative electrode of a power storage device using the material for an electrode of a power storage device described in Embodiment 1 and a method for forming the negative electrode will be described with reference to FIGS. 5A to 5D.

Figure 5A:
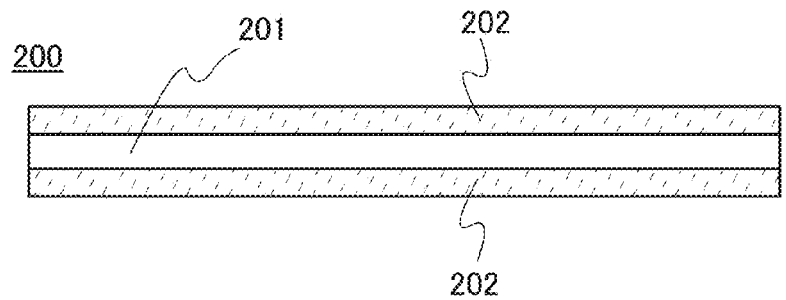
FIGS. 5A to 5D illustrate an example of a negative electrode of a power storage device.

As illustrated in FIG. 5A, a negative electrode 200 includes a negative electrode current collector 201 and a negative electrode active material layer 202 provided on one or both surfaces (on the both surfaces in the drawing) of the negative electrode current collector 201.

The negative electrode current collector 201 is formed using a highly conductive material which is not alloyed with a carrier ion such as lithium. For example, stainless steel, copper, nickel, or titanium can be used. In addition, the negative electrode current collector 201 can have a foil-like shape, a plate-like shape (sheet-like shape), a net-like shape, a punching-metal shape, an expanded-metal shape, or the like as appropriate. The negative electrode current collector 201 preferably has a thickness of more than or equal to 10 μm and less than or equal to 30 μm.

The negative electrode active material layer 202 is provided on one or both surfaces of the negative electrode current collector 201. For the negative electrode active material layer 202, the electrode material described in Embodiment 1 can be used.

In this embodiment, the negative electrode active material layer 202 formed by mixing and baking the electrode material described in Embodiment 1, a conductive additive, and a binder is used.

Figure 5B:
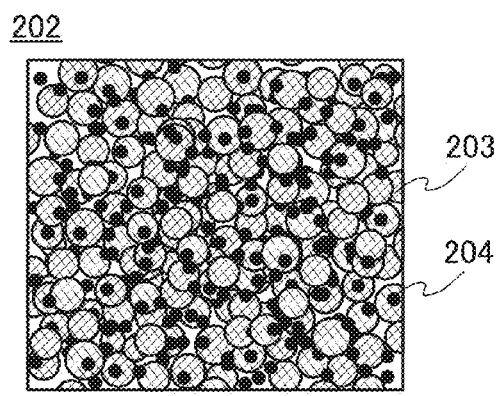

The negative electrode active material layer 202 is described with reference to FIG. 5B. FIG. 5B is a cross-sectional view of part of the negative electrode active material layer 202. The negative electrode active material layer 202 includes the electrode material described in Embodiment 1, a conductive additive 204, and a binder (not illustrated).

The conductive additive 204 has a function of increasing the conductivity between the granular negative electrode active materials 203 or between the granular negative electrode active material 203 and the negative electrode current collector 201, and is preferably added to the negative electrode active material layer 202, for example. A material with a large specific surface is desirably used as the conductive additive 204, and acetylene black (AB) or the like can be used. Alternatively, a carbon material such as a carbon nanotube, graphene, or fullerene can be used as the conductive additive 204. Note that the case of using graphene is described later as an example.

As the binder, a material which at least binds the negative electrode active material, the conductive additive, and the current collector is used. Examples of the binder include resin materials such as polyvinylidene fluoride (PVDF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

The negative electrode 200 is formed in the following manner. First, the electrode material made by the method described in Embodiment 1 is mixed to a solvent such as NMP (N-methylpyrrolidone) in which a vinylidene fluoride based polymer such as polyvinylidene fluoride is dissolved, whereby slurry is formed.

Next, the slurry is applied on one or both surfaces of the negative electrode current collector 201, and dried. In the case where the application step is performed on both surfaces of the negative electrode current collector 201, the negative electrode active material layers 202 are formed on the surfaces at the same time or one by one. Then, rolling with a roller press machine is performed, whereby the negative electrode 200 is formed.

Next, an example of using graphene as the conductive additive added to the negative electrode active material layer 202 is described with reference to FIGS. 5C and 5D.

Figure 5C:
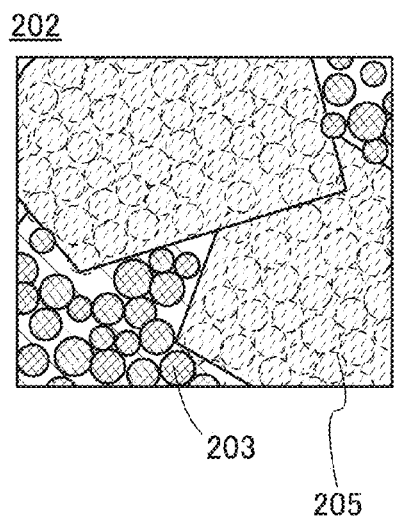

FIG. 5C is a plan view of part of the negative electrode active material layer 202 using graphene. The negative electrode active material layer 202 includes the granular negative electrode active materials 203 which correspond to the granular active materials 110 described in Embodiment 1 and graphenes 205. The graphene 205 covers a plurality of granular negative electrode active materials 203 and at least partly surround the plurality of granular negative electrode active materials 203. A binder which is not illustrated may be added; however, in the case where the graphenes 205 are contained so that they are bound to each other to function well as a binder, the binder is not necessarily added. In the plan view of the negative electrode active material layer 202, different graphenes 205 cover the surfaces of the granular negative electrode active materials 203. The granular negative electrode active materials 203 may be partly exposed.

Figure 5D:
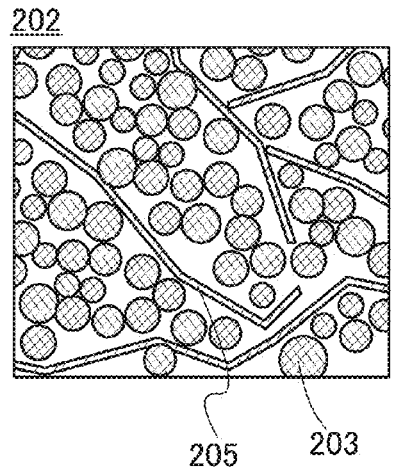

FIG. 5D is a cross-sectional view of part of the negative electrode active material layer 202 in FIG. 5C. FIG. 5D illustrates the granular negative electrode active materials 203 and the graphenes 205. In the plan view of the negative electrode active material layer 202, the graphene 205 covers a plurality of granular negative electrode active materials 203. The graphene 205 has a linear shape when observed in the cross-sectional view. The plurality of granular negative electrode active materials 203 are at least partly surrounded with one graphene 205 or a plurality of graphenes 205 or sandwiched between the plurality of graphenes 205. Note that the graphene 205 has a bag-like shape and the plurality of granular negative electrode active materials 203 is surrounded by the graphene 205 in some cases. In addition, the granular negative electrode active materials 203 are partly not covered with the graphene 205 and exposed in some cases.

The thickness of the negative electrode active material layer 202 is preferably selected as appropriate in the range of 20 μm to 150 μm.

Note that the negative electrode active material layer 202 may be predoped with lithium. Predoping with lithium may be performed in such a manner that a lithium layer is formed on a surface of the negative electrode active material layer 202 by a sputtering method. Alternatively, lithium foil is provided on the surface of the negative electrode active material layer 202, whereby the negative electrode active material layer 202 can be predoped with lithium.

As an example of the granular negative electrode active material 203, there is a material whose volume is expanded by occlusion of carrier ions. Thus, the negative electrode active material layer including such a material gets friable and is partly broken by charge and discharge, which reduces the reliability (e.g., cycle performance) of the power storage device.

However, even when the volume of the negative electrode active material is expanded due to charge and discharge, the graphene 205 partly covers the periphery of the granular negative electrode active materials 203, which allows prevention of dispersion of the negative electrode active materials and the breakdown of the negative electrode active material layer. That is to say, the graphene 205 has a function of maintaining the bond between the positive electrode active materials even when the volume of the positive electrode active material fluctuates by charge and discharge. For this reason, a binder does not need to be used in forming the negative electrode active material layer 202. Accordingly, the proportion of the negative electrode active material in the negative electrode active material layer 202 with certain weight (certain volume) can be increased, leading to an increase in charge and discharge capacity per unit weight (unit volume) of the electrode.

The graphene 205 has conductivity and is in contact with a plurality of granular negative electrode active materials 203; thus, it also serves as a conductive additive. That is, a conductive additive does not need to be used in forming the negative electrode active material layer 202. Accordingly, the proportion of the negative electrode active material in the negative electrode active material layer 202 with certain weight (certain volume) can be increased, leading to an increase in charge and discharge capacity per unit weight (unit volume) of the electrode.

Furthermore, the graphene 205 efficiently forms a sufficient conductive path of electrons in the negative electrode active material layer 202, which increases the conductivity of the negative electrode 200.

Note that the graphene 205 also functions as a negative electrode active material that can occlude and release carrier ions, leading to an increase in charge capacity of the negative electrode 200.

Next, a method for forming the negative electrode active material layer 202 in FIGS. 5C and 5D is described.

First, the electrode material described in Embodiment 1 and a dispersion liquid containing graphene oxide are mixed to form slurry.

Next, the slurry is applied onto the negative electrode current collector 201. Next, drying is performed in a vacuum for a certain period of time to remove a solvent from the slurry applied onto the negative electrode current collector 201. Then, rolling with a roller press machine is performed.

Then, the graphene oxide is electrochemically reduced with electric energy or thermally reduced by heating treatment to form the graphene 205. Particularly in the case where electrochemical reduction treatment is performed, a proportion of $C(\pi)$-$C(\pi)$ double bonds of graphene formed by the electrochemical reduction treatment is higher than that of graphene formed by heating treatment; therefore, the graphene 205 having high conductivity can be formed. Through the above steps, the negative electrode active material layer 202 used as a conductive additive can be formed on one or both surfaces of the negative electrode current collector 201, and thus the negative electrode 200 can be formed.

(Embodiment 3)

In this embodiment, a structure of a lithium ion battery as a power storage device and a method for manufacturing the lithium ion battery are described.

(Positive Electrode)

First, a positive electrode and a method for forming the positive electrode will be described.

Figure 6A:
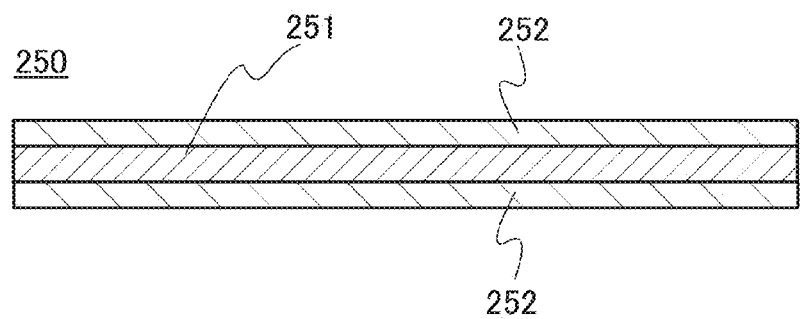
FIGS. 6A to 6C illustrate an example of a negative electrode of a power storage device.

FIG. 6A is a cross-sectional view of a positive electrode 250. In the positive electrode 250, a positive electrode active material layer 252 is formed over a positive electrode current collector 251.

For the positive electrode current collector 251, a highly conductive material such as a metal typified by stainless steel, gold, platinum, zinc, iron, aluminum, or titanium, or an alloy of these metals can be used. Note that the positive electrode current collector 251 can be formed using an aluminum alloy to which an element which improves heat resistance, such as silicon, titanium, neodymium, scandium, or molybdenum, is added. Further alternatively, the positive electrode current collector 251 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 251 can have a foil-like shape, a plate-like shape (a sheet-like shape), a net-like shape, a punching-metal shape, an expanded-metal shape, or the like as appropriate.

In addition to a positive electrode active material, a conductive additive and a binder may be included in the positive electrode active material layer 252.

As the positive electrode active material of the positive electrode active material layer 252, a compound such as $LiFeO_2$, $LiCoO_2$, $LiNiO_2$, $LiMn_2O_4$, $V_2O_5$, $Cr_2O_5$, or $MnO_2$ can be used.

Alternatively, an olivine-type lithium-containing composite phosphate ($LiMPO_4$ (general formula) (M is one or more of Fe(II), Mn(II), Co(II), and Ni(II))) can be used for the positive electrode active material. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

Alternatively, as the positive electrode active material, a lithium-containing composite silicate represented by a general formula $Li_{(2-j)}MSiO_4$ (M is one or more of Fe(II), Mn(II), Co(II), and Ni(II); 0≤j<2) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), $Li_{(2-j)}Fe_rNi_sCo_tMn_uSiO_4$ (r+s+t+u≤1, 0<r<1, 0<s<1, 0<t<1, and 0<u<1), and the like.

In the case where carrier ions are alkaline-earth metal ions or alkali metal ions other than lithium ions, the positive electrode active material layer 252 may contain, instead of lithium in the above lithium compound, lithium-containing composite phosphate, and lithium-containing composite silicate, an alkali metal (e.g., sodium or potassium) or an alkaline-earth metal (e.g., calcium, strontium, barium, beryllium, or magnesium).

The positive electrode active material layer 252 is not necessarily formed in contact with the positive electrode current collector 251. Between the positive electrode current collector 251 and the positive electrode active material layer 252, any of the following functional layers may be formed using a conductive material such as a metal: an adhesive layer for the purpose of improving adhesiveness between the positive electrode current collector 251 and the positive electrode active material layer 252, a planarization layer for reducing unevenness of the surface of the positive electrode current collector 251, a heat radiation layer for radiating heat, and a stress relaxation layer for relieving stress of the positive electrode current collector 251 or the positive electrode active material layer 252.

Figure 6B:
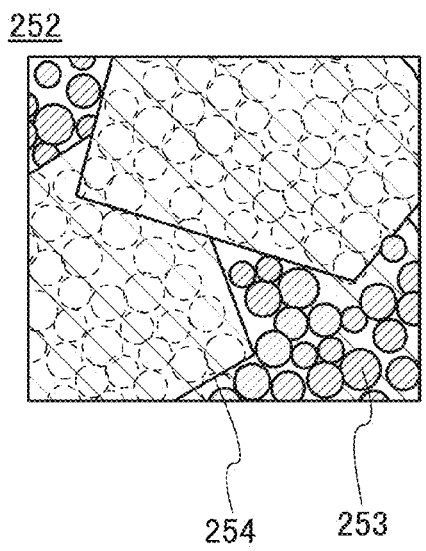

FIG. 6B is a plan view of the positive electrode active material layer 252. For the positive electrode active material layer 252, granular positive electrode active materials 253 that can occlude and release carrier ions are used. An example is shown in which the positive electrode active material layer 252 includes graphenes 254 covering a plurality of granular positive electrode active materials 253 and at least partly surrounding the plurality of granular positive electrode active materials 253. The different graphenes 254 cover surfaces of the plurality of granular positive electrode active materials 253. The granular positive electrode active materials 253 may be partly exposed.

The particle diameter of the granular positive electrode active material 253 is preferably greater than or equal to 20 nm and less than or equal to 100 nm. Note that the particle diameter of the granular positive electrode active material 253 is preferably smaller because electrons transfer in the granular positive electrode active material 253.

Although sufficient characteristics can be obtained even when the surface of the granular positive electrode active material 253 is not covered with a graphite layer, it is preferable to use the granular positive electrode active material 253 covered with a graphite layer, in which case hopping of carrier ions occurs between the granular positive electrode active materials 253, so that current flows.

Figure 6C:
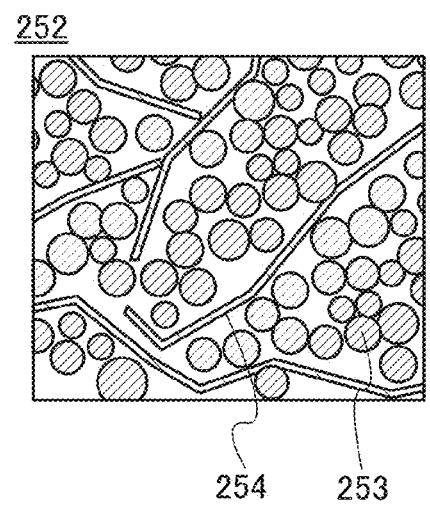

FIG. 6C is a cross-sectional view of part of the positive electrode active material layer 252 in FIG. 6B. The positive electrode active material layer 252 includes the granular positive electrode active materials 253 and the graphenes 254 covering a plurality of granular positive electrode active materials 253. The graphene 254 has a linear shape when observed in the cross-sectional view. The plurality of granular positive electrode active materials 253 are at least partly surrounded with one graphene 254 or a plurality of graphenes 254 or sandwiched between the plurality of graphenes 254. Note that the graphene 254 has a bag-like shape and the plurality of granular positive electrode active materials 253 is surrounded by the graphene 254 in some cases. In addition, the positive electrode active materials are partly not covered with the graphene 254 and exposed in some cases.

The desired thickness of the positive electrode active material layer 252 is determined in the range of 20 µm to 100 µm. It is preferable to adjust the thickness of the positive electrode active material layer 252 as appropriate so that cracks and separation do not occur.

Note that the positive electrode active material layer 252 may contain a known conductive additive, for example, acetylene black particles having a volume 0.1 to 10 times as large as that of the graphene or carbon particles such as carbon nanofibers having a one-dimensional expansion.

Depending on a material of the positive electrode active material, the volume is expanded by occlusion of ions serving as carriers. When such a material is used, the positive electrode active material layer gets vulnerable and is partly collapsed by charge and discharge, which results in lower reliability of a power storage device. However, even when the volume of the positive electrode active material expands due to charge and discharge, the graphene partly covers the periphery of the positive electrode active material, which allows prevention of dispersion of the positive electrode active material and the breakage of the positive electrode active material layer. That is to say, the graphene has a function of maintaining the bond between the positive electrode active materials even when the volume of the positive electrode active materials fluctuates by charge and discharge.

The graphene 254 is in contact with the plurality of positive electrode active materials and serves also as a conductive additive. Further, the graphene 254 has a function of holding the positive electrode active material capable of occluding and releasing carrier ions. Thus, a binder does not have to be mixed into the positive electrode active material layer. Accordingly, the amount of the positive electrode active material in the positive electrode active material layer can be increased, which allows an increase in discharge capacity of non-aqueous secondary batteries.

Next, description is given of a method for forming the positive electrode active material layer 252.

First, slurry containing granular positive electrode active materials and graphene oxide is formed. Next, the slurry is applied onto the positive electrode current collector 251. Then, heating is performed in a reduced atmosphere for reduction treatment so that the positive electrode active materials are baked and oxygen included in the graphene oxide is extracted to form graphene. Note that oxygen in the graphene oxide is not entirely extracted and partly remains in the graphene. Through the above process, the positive electrode active material layer 252 can be formed over the positive electrode current collector 251. Consequently, the positive electrode active material layer 252 has higher conductivity.

Graphene oxide contains oxygen and thus is negatively charged in a polar solvent. As a result of being negatively charged, graphene oxide is dispersed in the polar solvent. Therefore, the positive electrode active materials contained in the slurry are not easily aggregated, so that the particle diameter of the positive electrode active material can be prevented from increasing due to aggregation. Thus, the transfer of electrons in the positive electrode active materials is facilitated, resulting in an increase in conductivity of the positive electrode active material layer.

Next, a structure and a method for manufacturing a lithium secondary battery are described with reference to FIGS. 7A and 7B. Here, a cross-sectional structure of the lithium ion secondary battery is described below.

(Coin-Type Lithium Ion Battery)

Figure 7A:
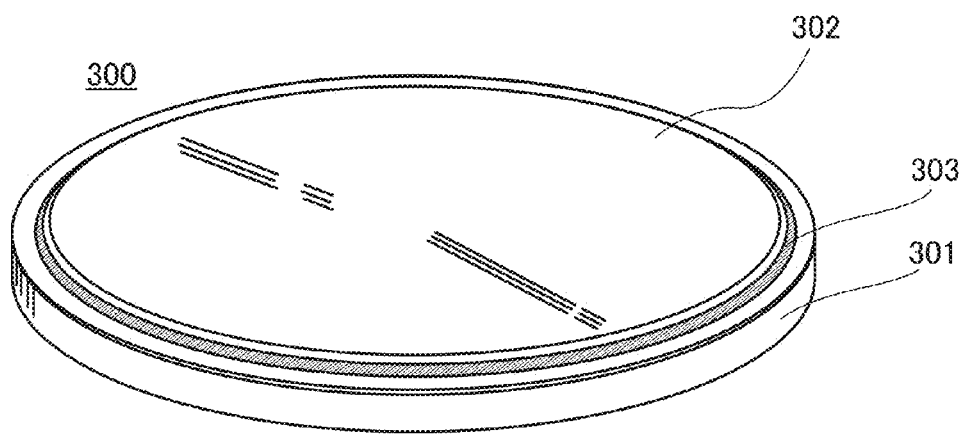
FIGS. 7A and 7B illustrate an example of a power storage device.
Figure 7B:
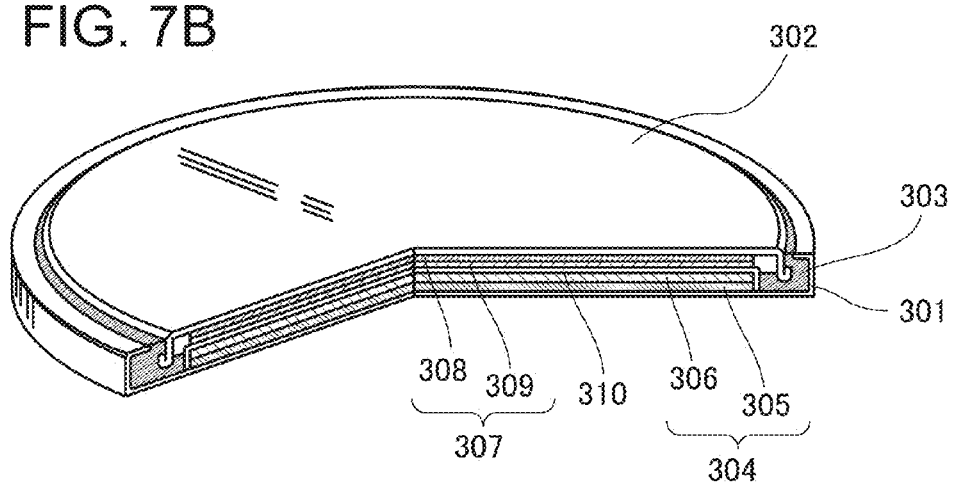

FIG. 7A is an external view of a coin-type (single-layer flat type) lithium ion battery, and FIG. 7B is a cross-sectional view thereof.

In a coin-type lithium ion battery 300, a positive electrode can 301 serving also as a positive electrode terminal and a negative electrode can 302 serving also as a negative electrode terminal are insulated and sealed with a gasket 303 formed of polypropylene or the like. In a manner similar to that of the above, a positive electrode 304 includes a positive electrode current collector 305 and a positive electrode active material layer 306 which is provided to be in contact with the positive electrode current collector 305. On the other hand, a negative electrode 307 includes a negative electrode current collector 308 and a negative electrode active material layer 309 which is provided to be in contact with the negative electrode current collector 308. A separator 310 and an electrolyte (not illustrated) are included between the positive electrode active material layer 306 and the negative electrode active material layer 309.

As the negative electrode 307, the negative electrode described in Embodiment 2 is used. As the positive electrode 304, the positive electrode 250 described in this embodiment can be used.

For the separator 310, an insulator such as cellulose (paper), polypropylene with pores, or polyethylene with pores can be used.

As an electrolyte of an electrolyte solution, a material which contains carrier ions is used. Typical examples of the electrolyte include lithium salts such as $LiClO_4$, $LiAsF_6$, $LiBF_4$, $LiPF_6$, and $Li(C_2F_5SO_2)_2N$.

In the case where carrier ions are alkali metal ions other than lithium ions or alkaline-earth metal ions, the electrolyte may contain, instead of lithium in the lithium salts, an alkali metal (e.g., sodium or potassium), an alkaline-earth metal (e.g., calcium, strontium, barium, beryllium, or magnesium).

As a solvent of the electrolyte solution, a material in which the carrier ions can transfer is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. With the use of a gelled high-molecular material as the solvent of the electrolyte solution, safety against liquid leakage and the like is improved. Furthermore, a lithium ion battery can be thinner and more lightweight. Typical examples of gelled high-molecular materials include a silicone gel, an acrylic gel, an acrylonitrile gel, polyethylene oxide, polypropylene oxide, and a fluorine-based polymer. Alternatively, the use of one or more of ionic liquids (room temperature molten salts) which are less likely to burn and volatilize as the solvent of the electrolyte solution can prevent the lithium ion battery from exploding or catching fire even when the secondary battery internally shorts out or the internal temperature increases due to overcharging or the like.

Instead of the electrolyte solution, a solid electrolyte including a sulfide-based inorganic material, an oxide-based inorganic material, or the like, or a solid electrolyte including a polyethylene oxide (PEO)-based high-molecular material or the like can be used. In the case of using the solid electrolyte, a separator is not necessary. Further, the battery can be entirely solidified; therefore, there is no possibility of liquid leakage and thus the safety of the battery is dramatically increased.

For the positive electrode can 301 and the negative electrode can 302, a corrosion-resistant metal such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion by the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 7B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type lithium ion battery 300 is manufactured.

(Laminated Lithium Ion Battery)

Next, an example of a laminated lithium ion battery is described with reference to FIG. 8.

Figure 8:
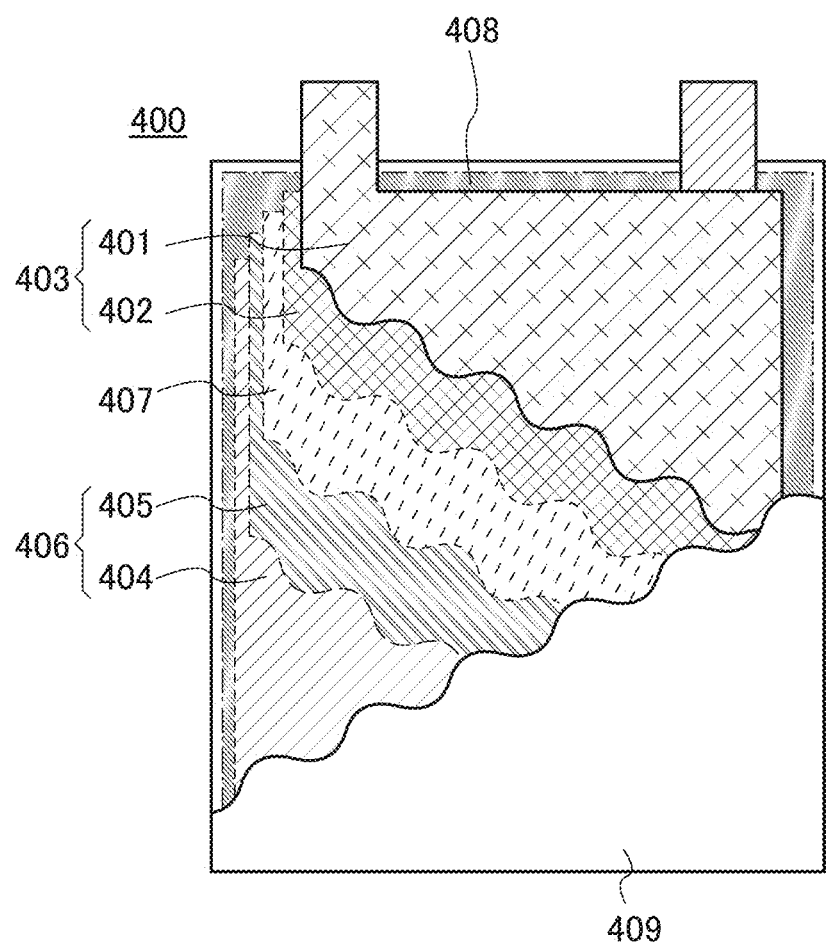
FIG. 8 illustrates an example of a power storage device.

In a laminated lithium ion battery 400 illustrated in FIG. 8, a positive electrode 403 including a positive electrode current collector 401 and a positive electrode active material layer 402, a separator 407, and a negative electrode 406 including a negative electrode current collector 404 and a negative electrode active material layer 405 are stacked and sealed in an exterior body 409, and then an electrolyte solution 408 is injected into the exterior body 409. Although FIG. 8 illustrates the laminated lithium ion battery 400 with a structure in which one sheet-like positive electrode 403 and one sheet-like negative electrode 406 are stacked, to increase the capacity of the battery, the stack is preferably wound or a plurality of positive electrodes and negative electrodes are stacked and then laminated. Particularly in the case of the laminated lithium ion battery, the battery has flexibility and thus is suitable for applications which require flexibility.

In the laminated lithium ion battery 400 illustrated in FIG. 8, the positive electrode current collector 401 and the negative electrode current collector 404 serve as terminals for an electrical contact with the outside. For this reason, the positive electrode current collector 401 and the negative electrode current collector 404 are arranged so that part of the positive electrode current collector 401 and part of the negative electrode current collector 404 are exposed outside the exterior body 409.

As the exterior body 409 in the laminated lithium ion battery 400, for example, a laminate film having a three-layer structure in which a highly flexible metal thin film of aluminum, stainless steel, copper, nickel, or the like is provided over the inner surface of a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be provided.

(Cylindrical Lithium Ion Battery)

Figure 9A:
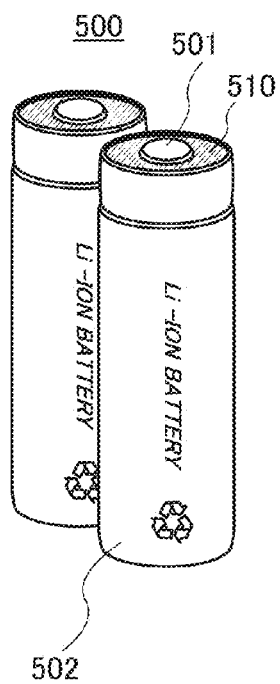
FIGS. 9A and 9B illustrate an example of a power storage device.

Next, an example of a cylindrical lithium ion battery is described with reference to FIGS. 9A and 9B. As illustrated in FIG. 9A, a cylindrical lithium ion battery 500 includes a positive electrode cap (battery lid) 501 on its top surface and a battery can (exterior can) 502 on its side surface and bottom surface. The positive electrode cap 501 and the battery can 502 are insulated from each other by a gasket 510 (insulating packing).

Figure 9B:
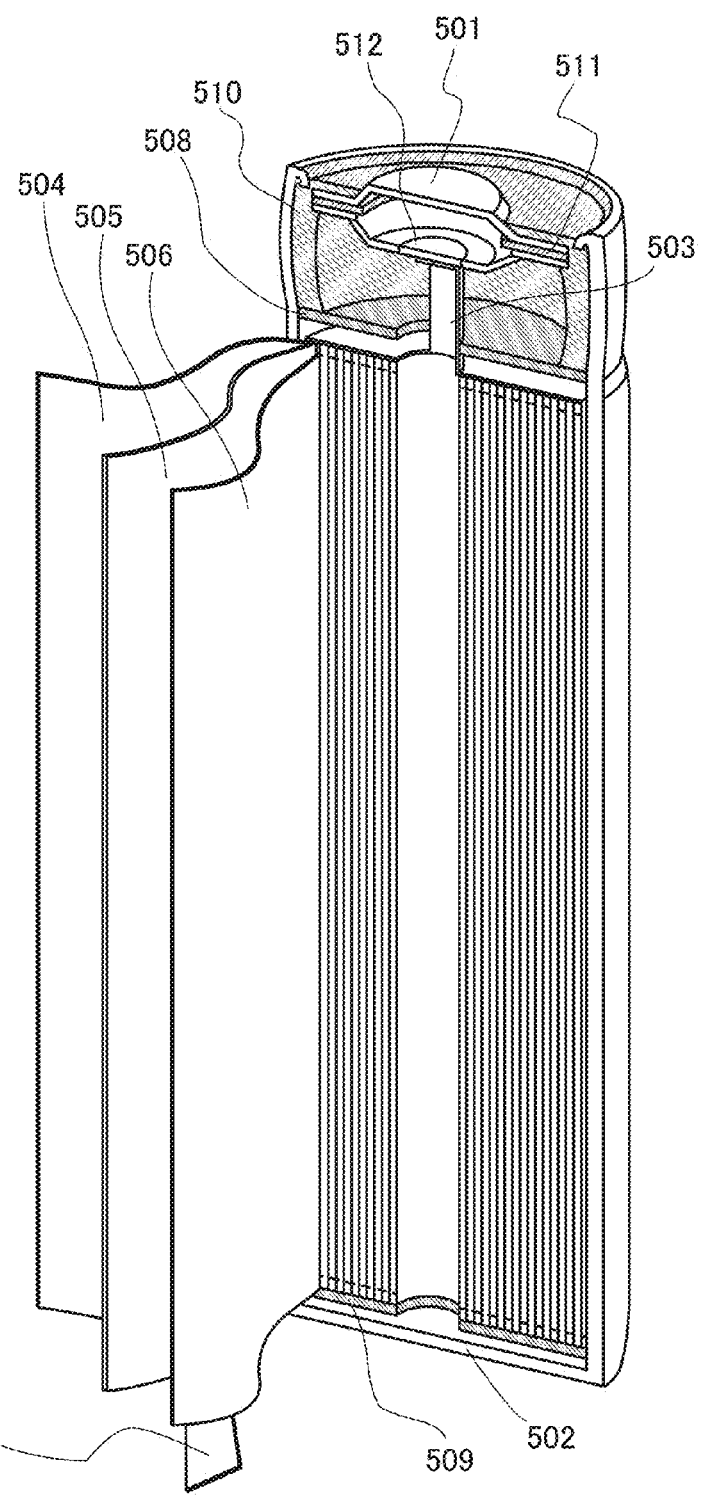

FIG. 9B is a diagram schematically illustrating a cross section of the cylindrical lithium ion battery. In the battery can 502 with a hollow cylindrical shape, a battery element is provided in which a strip-like positive electrode 504 and a strip-like negative electrode 506 are wound with a separator 505 provided therebetween. Although not illustrated, the battery element is wound around a center pin as a center. One end of the battery can 502 is close and the other end thereof is open. For the battery can 502, a corrosion-resistant metal such as nickel, aluminum, or titanium, an alloy of such a metal, or an alloy of such a metal and another metal (e.g., stainless steel or the like) can be used. Alternatively, the battery can 502 is preferably covered with nickel, aluminum, or the like in order to prevent corrosion by the electrolyte solution. Inside the battery can 502, the battery element in which the positive electrode, the negative electrode, and the separator are wound is interposed between a pair of insulating plates 508 and 509 which face each other. Further, an electrolyte solution (not illustrated) is injected inside the battery can 502 in which the battery element is provided. An electrolyte solution which is similar to that of the coin-type lithium ion battery or the laminated lithium ion battery can be used.

Although the positive electrode 504 and the negative electrode 506 can be formed in a manner similar to that of the positive electrode and the negative electrode of the coin-type lithium ion battery, the difference lies in that, since the positive electrode and the negative electrode of the cylindrical lithium ion battery are wound, active materials are formed on both sides of the current collectors. A positive electrode terminal (positive electrode current collecting lead) 503 is connected to the positive electrode 504, and a negative electrode terminal (negative electrode current collecting lead) 507 is connected to the negative electrode 506. A metal material such as aluminum can be used for both the positive electrode terminal 503 and the negative electrode terminal 507. The positive electrode terminal 503 is resistance-welded to a safety valve mechanism 512, and the negative electrode terminal 507 is resistance-welded to the bottom of the battery can 502. The safety valve mechanism 512 is electrically connected to the positive electrode cap 501 through a positive temperature coefficient (PTC) element 511. The safety valve mechanism 512 cuts off electrical connection between the positive electrode cap 501 and the positive electrode 504 when the internal pressure of the battery increases and exceeds a predetermined threshold value. The PTC element 511 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type lithium ion battery, the laminated lithium ion battery, and the cylindrical lithium ion battery are given as examples of the lithium ion battery; however, any of lithium ion batteries with various shapes, such as a sealing-type lithium ion battery and a square-type lithium ion battery, can be used. Further, a structure in which a plurality of positive electrodes, a plurality of negative electrodes, and a plurality of separators are stacked or wound may be employed.

The electrode for a power storage device which is one embodiment of the present invention is used as the negative electrode in each of the lithium ion battery 300, the lithium ion battery 400, and the lithium ion battery 500 described in this embodiment. Thus, the lithium ion battery 300, the lithium ion battery 400, and the lithium ion battery 500 can have favorable cycle performance. For example, after 500 cycles of charge and discharge, the capacity of the power storage device is preferably higher than or equal to 60% of the initial capacity. In addition, irreversible capacity generated in initial charge and discharge can be reduced; moreover, a lithium ion battery with favorable high temperature characteristics can be provided.

This embodiment can be implemented in combination with any of the other embodiments as appropriate.

(Embodiment 4)

In this embodiment, a lithium ion capacitor is described as a power storage device.

The lithium ion capacitor is a hybrid capacitor which combines a positive electrode of an electrical double layer capacitor (EDLC) and a negative electrode of a lithium ion battery using a carbon material, and also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in advance as the carbon material or the like that is a negative electrode active material, the lithium ion capacitor can have energy density dramatically higher than that of a conventional electrical double layer capacitor including a negative electrode using active carbon.

In the lithium ion capacitor, instead of the positive electrode active material layer in the lithium ion battery described in Embodiment 3, a material capable of reversibly having at least one of lithium ions and anions is used. Examples of such a material include active carbon, a conductive high molecule, and a polyacene-based organic semiconductor (PAS).

The lithium ion capacitor has high efficiency of charge and discharge, capability of rapidly performing charge and discharge, and a long life even when it is repeatedly used.

As the negative electrode of such a lithium ion capacitor, the negative electrode of a power storage device which is described in Embodiment 2 is used. Thus, irreversible capacity generated in initial charge and discharge is reduced, so that a power storage device having improved cycle performance can be manufactured. Furthermore, a power storage device having excellent high temperature characteristics can be manufactured.

This embodiment can be implemented in combination with any of the other embodiments as appropriate.

(Embodiment 5)

A power storage device of one embodiment of the present invention can be used as a power supply of various electrical appliances which are driven by electric power.

Specific examples of electrical appliances each using the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by an electric motor using power from a power storage device are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electrical appliances, the power storage device of one embodiment of the present invention can be used as a main power source for supplying enough power for almost the whole power consumption. Alternatively, in the above electrical appliances, the power storage device of one embodiment of the present invention can be used as an uninterruptible power source which can supply power to the electrical appliances when the supply of power from the main power source or a commercial power source is stopped. Still alternatively, in the above electrical appliances, the power storage device of one embodiment of the present invention can be used as an auxiliary power source for supplying power to the electrical appliances at the same time as the power supply from the main power source or a commercial power source.

Figure 10:
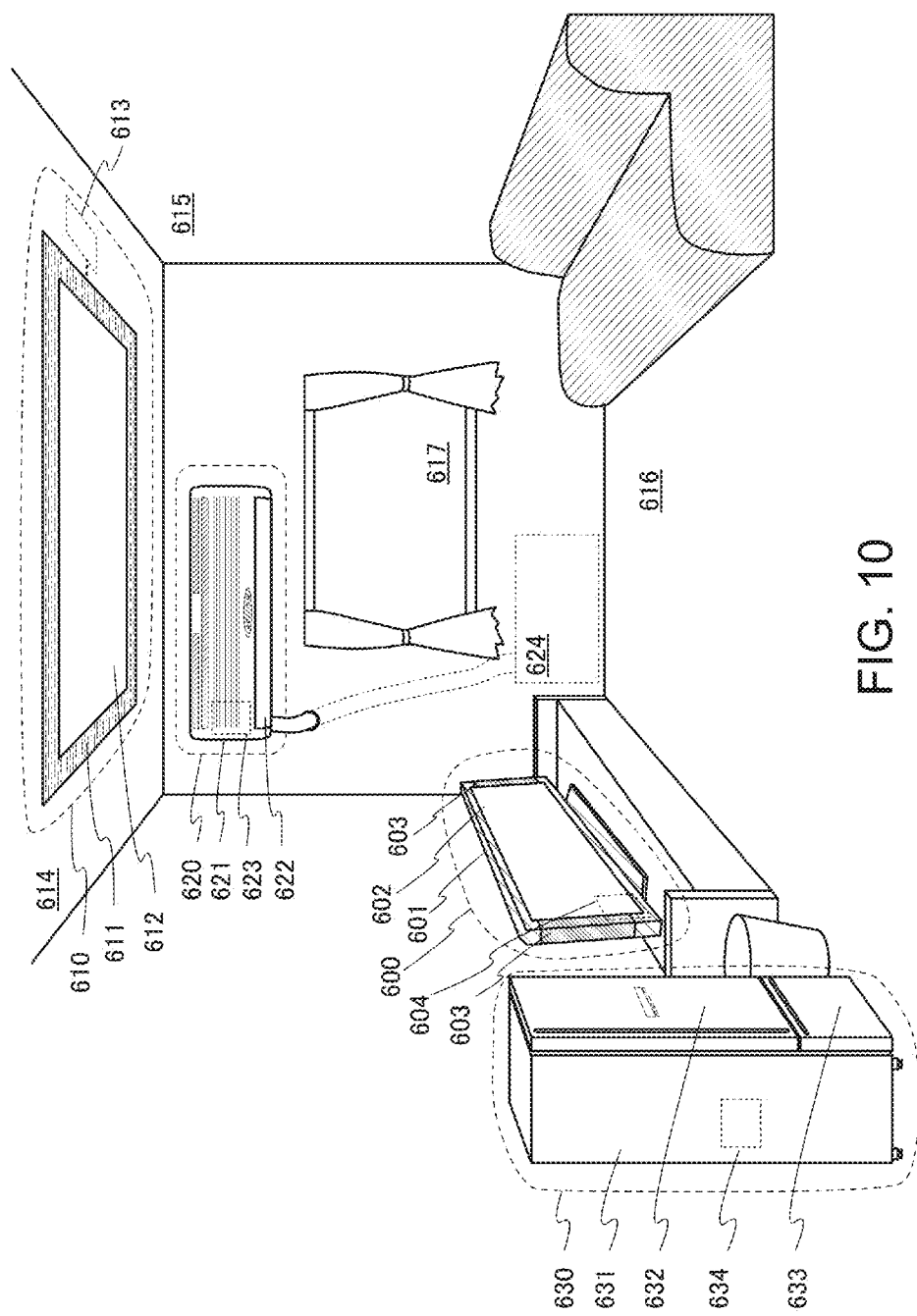
FIG. 10 illustrates examples of electrical appliances.

FIG. 10 illustrates specific structures of the electrical appliances. In FIG. 10, a display device 600 is an example of an electrical appliance using a power storage device 604 of one embodiment of the present invention. Specifically, the display device 600 corresponds to a display device for TV broadcast reception and includes a housing 601, a display portion 602, speaker portions 603, the power storage device 604, and the like. The power storage device 604 of one embodiment of the present invention is provided in the housing 601. The display device 600 can receive power from a commercial power source. Alternatively, the display device 600 can use power stored in the power storage device 604. Thus, the display device 600 can be operated with the use of the power storage device 604 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 602.

Note that the display device includes, in its category, all of information display devices for personal computers, advertisement displays, and the like in addition to TV broadcast reception.

In FIG. 10, an installation lighting device 610 is an example of an electrical appliance using a power storage device 613 of one embodiment of the present invention. Specifically, the installation lighting device 610 includes a housing 611, a light source 612, the power storage device 613, and the like. Although FIG. 10 illustrates the case where the power storage device 613 is provided in a ceiling 614 on which the housing 611 and the light source 612 are installed, the power storage device 613 may be provided in the housing 611. The installation lighting device 610 can receive power from a commercial power source. Alternatively, the installation lighting device 610 can use power stored in the power storage device 613. Thus, the installation lighting device 610 can be operated with the use of the power storage device 613 of one embodiment of the present invention as an uninterruptible power source even when power cannot be supplied from a commercial power source due to power failure or the like.

Note that although the installation lighting device 610 provided in the ceiling 614 is illustrated in FIG. 10 as an example, the power storage device of one embodiment of the present invention can be used as an installation lighting device provided in, for example, a wall 615, a floor 616, a window 617, or the like other than the ceiling 614. Alternatively, the power storage device can be used in a tabletop lighting device or the like.

As the light source 612, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 10, an air conditioner including an indoor unit 620 and an outdoor unit 624 is an example of an electrical appliance using a power storage device 623 of one embodiment of the present invention. Specifically, the indoor unit 620 includes a housing 621, an air outlet 622, the power storage device 623, and the like. Although FIG. 10 illustrates the case where the power storage device 623 is provided in the indoor unit 620, the power storage device 623 may be provided in the outdoor unit 624. Alternatively, the power storage device 623 may be provided in both the indoor unit 620 and the outdoor unit 624. The air conditioner can receive power from a commercial power source. Alternatively, the air conditioner can use power stored in the power storage device 623. Particularly in the case where the power storage devices 623 are provided in both the indoor unit 620 and the outdoor unit 624, the air conditioner can be operated with the use of the power storage device 623 of one embodiment of the present invention as an uninterruptible power source even when power cannot be supplied from a commercial power source due to power failure or the like.

Note that although the split-type air conditioner including the indoor unit and the outdoor unit is illustrated in FIG. 10 as an example, the power storage device of one embodiment of the present invention can be used in an air conditioner in which the functions of an indoor unit and an outdoor unit are integrated in one housing.

In FIG. 10, an electric refrigerator-freezer 630 is an example of an electrical appliance using a power storage device 634 of one embodiment of the present invention. Specifically, the electric refrigerator-freezer 630 includes a housing 631, a door for a refrigerator 632, a door for a freezer 633, the power storage device 634, and the like. The power storage device 634 is provided inside the housing 631 in FIG. 10. The electric refrigerator-freezer 630 can receive power from a commercial power source. Alternatively, the electric refrigerator-freezer 630 can use power stored in the power storage device 634. Thus, the electric refrigerator-freezer 630 can be operated with the use of the power storage device 634 of one embodiment of the present invention as an uninterruptible power source even when power cannot be supplied from a commercial power source due to power failure or the like.

Note that among the electrical appliances described above, a high-frequency heating apparatus such as a microwave oven and an electrical appliance such as an electric rice cooker require high power in a short time. The tripping of a circuit breaker of a commercial power source in use of electrical appliances can be prevented by using the power storage device of one embodiment of the present invention as an auxiliary power source for supplying power which cannot be supplied enough by a commercial power source.

In addition, in a time period when electrical appliances are not used, particularly when the proportion of the amount of power which is actually used to the total amount of power which can be supplied from a commercial power source (such a proportion referred to as a usage rate of power) is low, power can be stored in the power storage device, whereby the usage rate of power can be reduced in a time period when the electrical appliances are used. For example, in the case of the electric refrigerator-freezer 630, power can be stored in the power storage device 634 in nighttime when the temperature is low and the door for a refrigerator 632 and the door for a freezer 633 are not often opened and closed. On the other hand, in daytime when the temperature is high and the door for a refrigerator 632 and the door for a freezer 633 are frequently opened and closed, the power storage device 634 is used as an auxiliary power source; thus, the usage rate of power in daytime can be reduced.

This embodiment can be implemented in combination with any of the other embodiments as appropriate.

(Embodiment 6)

Next, a portable information terminal which is an example of an electrical appliance is described with reference to FIGS. 11A to 11C.

Figure 11A:
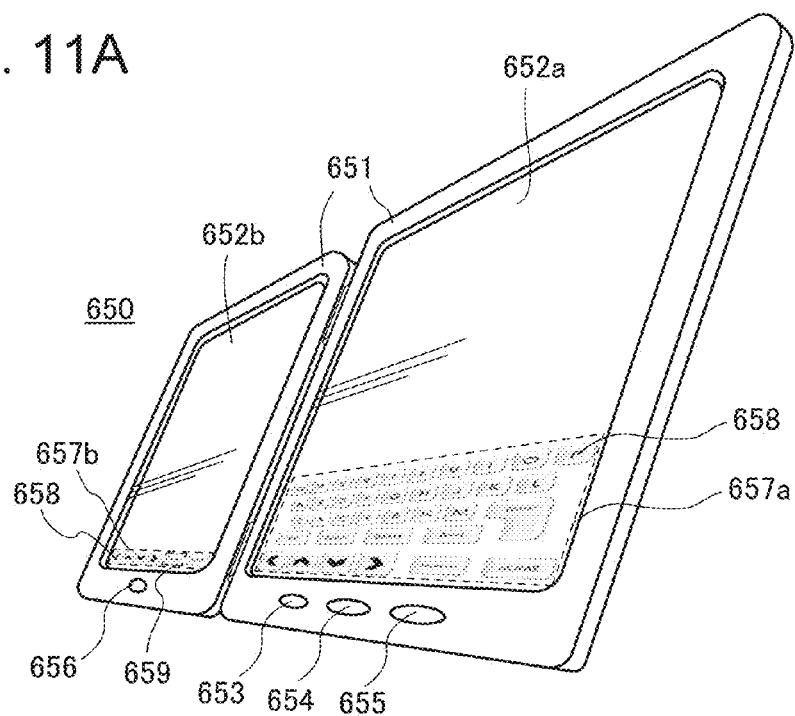
FIGS. 11A to 11C illustrate examples of electrical appliances.
Figure 11B:
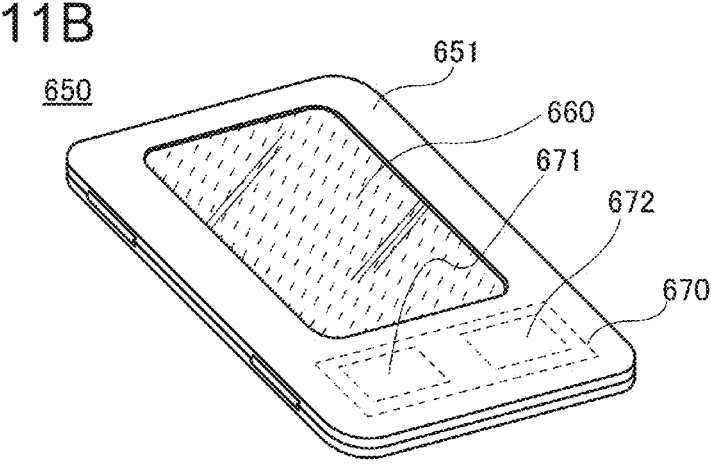

FIGS. 11A and 11B illustrate a tablet terminal 650 that can be folded. FIG. 11A illustrates the tablet terminal 650 in the state of being unfolded. The tablet terminal 650 includes a housing 651, a display portion $652a$, a display portion $652b$, a switch 653 for switching display modes, a power switch 654, a switch 655 for switching to power-saving-mode, and an operation switch 656.

Part of the display portion 652a can be a touch panel region 657a and data can be input when a displayed operation key 658 is touched. Note that FIG. 11A illustrates, as an example, that half of the area of the display portion 652a has only a display function and the other half of the area has a touch panel function. However, the structure of the display portion 652a is not limited to this, and all the area of the display portion 652a may have a touch panel function. For example, all the area of the display portion 652a can display keyboard buttons and serve as a touch panel while the display portion 652b can be used as a display screen.

Like the display portion 652a, part of the display portion 652b can be a touch panel region 657b. When a finger, a stylus, or the like touches the place where a button 659 for switching to keyboard display is displayed in the touch panel, keyboard buttons can be displayed on the display portion 652b.

Touch input can be performed on the touch panel regions 657a and 657b at the same time.

The switch 653 for switching display modes can switch the display between portrait mode, landscape mode, and the like, and between monochrome display and color display, for example. With the switch 655 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 652a is the same as that of the display portion 652b in FIG. 11A, one embodiment of the present invention is not particularly limited thereto. The display area of the display portion 652a may be different from that of the display portion 652b, and further, the display quality of the display portion 652a may be different from that of the display portion 652b. For example, one of them may be a display panel that can display higher-definition images than the other.

FIG. 11B illustrates the tablet terminal 650 in the state of being closed. The tablet terminal 650 includes the housing 651, a solar cell 660, a charge and discharge control circuit 670, a battery 671, and a DCDC converter 672. Note that FIG. 11B illustrates an example in which the charge and discharge control circuit 670 includes the battery 671 and the DCDC converter 672, and the battery 671 includes the power storage device described in any of the above embodiments.

Since the tablet terminal 650 can be folded, the housing 651 can be closed when the tablet terminal 650 is not in use. Thus, the display portions 652a and 652b can be protected, thereby providing the tablet terminal 650 with excellent endurance and excellent reliability for long-term use.

The tablet terminal illustrated in FIGS. 11A and 11B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached on the surface of the tablet terminal, supplies power to the touch panel, the display portion, a video signal processor, and the like. Note that the solar cell 660 is preferably provided on one or two surfaces of the housing 651, in which case the battery 671 can be charged efficiently. The use of the power storage device of one embodiment of the present invention as the battery 671 has advantages such as a reduction is size.

The structure and operation of the charge and discharge control circuit 670 illustrated in FIG. 11B are described with reference to a block diagram in FIG. 11C. The solar cell 660, the battery 671, the DCDC converter 672, a converter 673, switches SW1 to SW3, and the display portion 652 are illustrated in FIG. 11C, and the battery 671, the DCDC converter 672, the converter 673, and the switches SW1 to SW3 correspond to the charge and discharge control circuit 670 illustrated in FIG. 11B.

First, an example of the operation in the case where power is generated by the solar cell 660 using external light is described. The voltage of power generated by the solar cell 660 is raised or lowered by the DCDC converter 672 so that the power has a voltage for charging the battery 671. Then, when the power from the solar cell 660 is used for the operation of the display portion 652, the switch SW1 is turned on and the voltage of the power is raised or lowered by the converter 673 so as to be a voltage needed for the display portion 652. In addition, when display on the display portion 652 is not performed, the switch SW1 may be turned off and the switch SW2 may be turned on so that the battery 671 is charged.

Here, the solar cell 660 is described as an example of a power generation means; however, there is no particular limitation on the power generation means, and the battery 671 may be charged with another power generation means such as a piezoelectric element or a thermoelectric conversion element (Peltier element). For example, the battery 671 may be charged with a non-contact power transmission module that transmits and receives power wirelessly (without contact) to charge the battery or with a combination of other charging means.

Figure 11C:
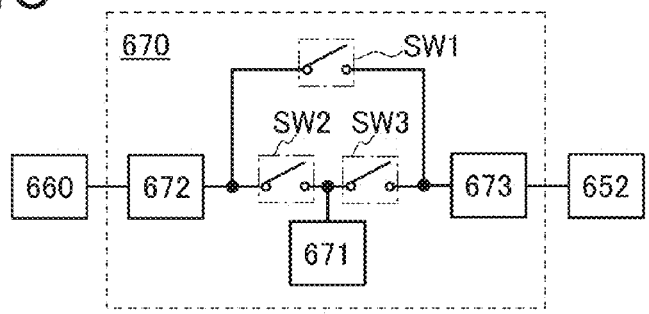

It is needless to say that one embodiment of the present invention is not limited to the electrical appliance illustrated in FIGS. 11A to 11C as long as the electrical appliance is equipped with the power storage device described in any of the above embodiments.

(Embodiment 7)

Further, an example of the moving object which is an example of the electrical appliance is described with reference to FIGS. 12A and 12B.

Any of the power storage device described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 12A:
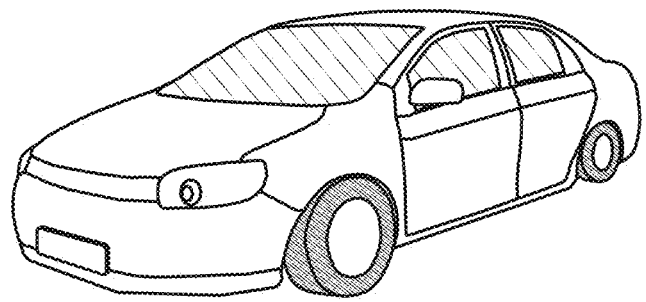
FIGS. 12A and 12B illustrate an example of an electrical appliance.
Figure 12B:
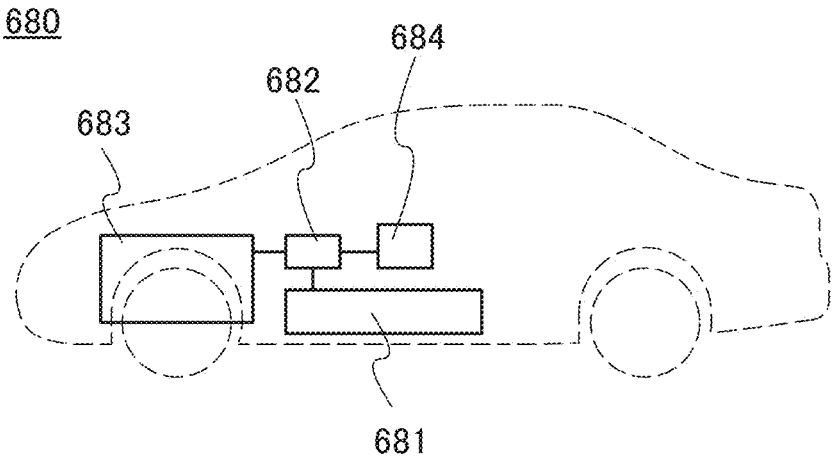

FIGS. 12A and 12B illustrate an example of an electric vehicle. An electric vehicle 680 is equipped with a battery 681. The output of the power of the battery 681 is adjusted by a control circuit 682 and the power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) by a driver of the electric vehicle 680 or data on driving the electric vehicle 680 (e.g., data on an upgrade or a downgrade, or data on a load on a driving wheel). The control circuit 682 adjusts the electric energy supplied from the battery 681 in response to the control signal of the processing unit 684 to control the output of the driving device 683. In the case where the AC motor is mounted, although not illustrated, an inverter which converts direct current into alternate current is also incorporated.

The battery 681 can be charged by external electric power supply using a plug-in technique. For example, the battery 681 is charged through a power plug from a commercial power source. The battery 681 can be charged by converting external power into DC constant voltage having a predetermined voltage level through a converter such as an ACDC converter. When the power storage device of one embodiment of the present invention is provided as the battery 681, capacity of the battery 681 can be increased and improved convenience can be realized. When the battery 681 itself can be made compact and lightweight with improved characteristics of the battery 681, the vehicle can be made lightweight, leading to an increase in fuel efficiency.

Note that it is needless to say that one embodiment of the present invention is not limited to the electrical appliance described above as long as the power storage device of one embodiment of the present invention is included.

This embodiment can be implemented in combination with any of the other embodiments as appropriate.

(Example)

In this example, a negative electrode of a power storage device, which includes a coating film formed of a silicon oxide, and a power storage device using the negative electrode, which are actually manufactured, will be described.

(Reference Example)

As a reference example, description will be made on an example of an electrode in which a silicon oxide film is formed over a layer serving as an active material.

In the reference example, a 100-μm-thick titanium sheet TR270C produced by JX Nippon Mining & Metals Corporation was used as a current collector, and a 200-nm-thick silicon film was formed over the current collector by a thermal CVD method. Moreover, $SiO_2$ powder was pelletized and deposited by electron beam heating, whereby a 100-nm-thick silicon oxide film was formed over the silicon film. Thus, an electrode (also referred to as an electrode A) was formed. An electrode (also referred to as an electrode B) was formed as a comparative example by forming only a 200-nm-thick silicon film over a current collector formed with the same material as the current collector in the electrode A.

A three-electrode cell (also referred to as a cell A) in which the electrode A is used as a working electrode and a three-electrode cell (also referred to as a cell B) in which the electrode B is used as a working electrode were fabricated. In this case, lithium was used for a reference electrode and a counter electrode in a three-electrode electrochemical measurement cell. In addition, an electrolyte solution was formed in such a way that lithium hexafluorophosphate ($LiPF_6$) was dissolved at a concentration of 1 mol/L in a solution in which ethylene carbonate (EC) and diethyl carbonate (DEC) were mixed at a volume ratio of 1:1.

Figure 13:
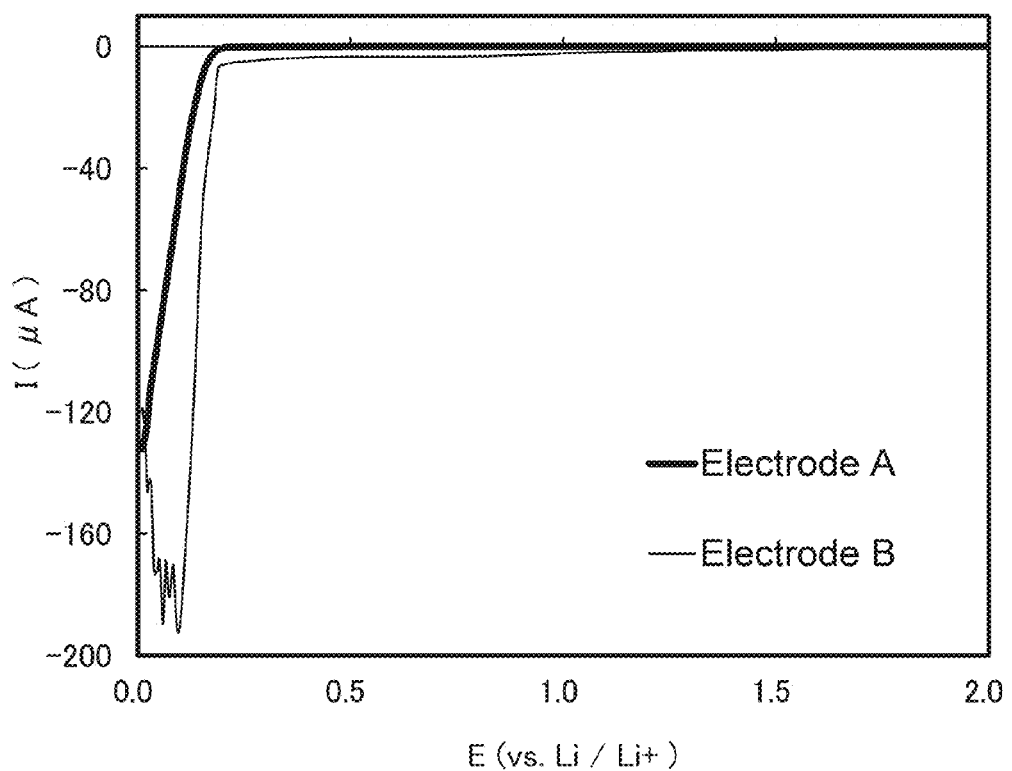
FIG. 13 is a graph showing results of CV measurement.

The cell A and the cell B are subjected to cyclic voltammetry (CV) measurement. The potential range in the CV measurement was 0 V to 2 V (vs. $Li/Li^+$), and scanning was performed only in the negative direction. The sweep rate in an electric field was set to 0.1 mV/sec. FIG. 13 is the cyclic voltammogram showing the CV measurement results.

FIG. 13 indicates that even in the case where the silicon film is covered with the silicon oxide film, lithium ions are inserted into the silicon film serving as an active material. The silicon oxide film has a function of allowing passage of lithium ions, and lithium ions react with the silicon film.

(Example of Power Storage Device)

As an example, a negative electrode of a power storage device and a power storage device using the negative electrode, which are actually manufactured, will be described.

In this example, graphite particles provided with a silicon oxide film were formed by a sol-gel method. For the graphite particles, graphite produced by JFE Chemical Corporation was used. First, silicon ethoxide, ethyl acetoacetate, and toluene were mixed and stirred to form a $Si(OEt)_4$ toluene solution, as described in Embodiment 1. At this time, the amount of silicon ethoxide was determined so that the proportion of silicon oxide formed later in graphite was 1 wt % (weight percent). The compounding ratio of this solution was as follows: $Si(OEt)_4$ was $3.14 \times 10^{-4}$ mol; ethyl acetoacetate, $6.28 \times 10^{-4}$ mol; and toluene, 2 ml. Next, graphite was added to the $Si(OEt)_4$ toluene solution and the mixture was stirred in a dry room. Then, the solution was held at 70° C. in a humid environment for 3 hours so that $Si(OEt)_4$ in the $Si(OEt)_4$ toluene solution to which graphite was added was hydrolyzed and condensed. In other words, $Si(OEt)_4$ in the solution was made to react with water in the air to gradually cause hydrolysis reaction, and $Si(OEt)_4$ was condensed by dehydration reaction which sequentially occurred. In such a manner, silicon which is a gel was attached onto a surface of graphite particles to form a net-like structure formed of C—O—Si bonds. Then, baking was performed in a nitrogen atmosphere at 500° C. for 3 hours, thereby forming an electrode material containing the graphite particles covered with a coating film formed of a silicon oxide. In addition, slurry formed by mixing the electrode material, acetylene black, and PVDF was applied onto a current collector and dried; thus, an electrode (also referred to as Electrode 1) was formed. At this time, the weight ratio of PVDF to graphite was 10 wt % (weight percent).

Figure 14:
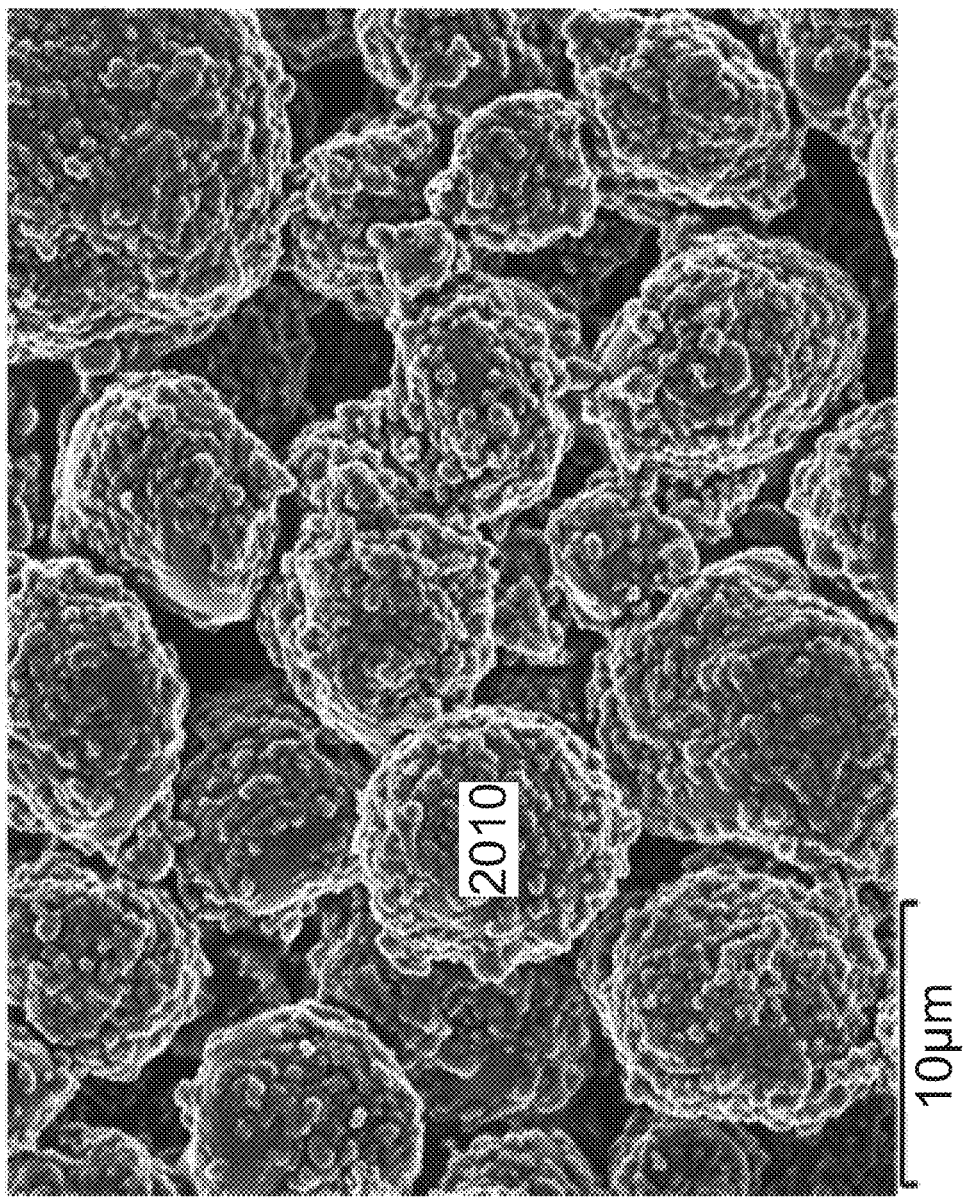
FIG. 14 is an image observed with SEM.

FIG. 14 is an observation image of Electrode 1 taken with a scanning electron microscope (SEM). FIG. 14 shows that a plurality of particles 2010 is formed. The plurality of particles has an average diameter of approximately 9 μm.

In addition, observation with a scanning transmission electron microscope (STEM) and energy dispersive X-ray spectroscopy (EDX) were performed on Electrode 1. FIGS. 15A and 15B show the results of the observation and analysis. The results of EDX in FIGS. 15A and 15B are obtained by line scanning.

In the STEM image in FIG. 15A, a relatively dark gray portion corresponds to the particle 2010. The plurality of particles 2010 can be observed.

A relatively light gray region 2011 exists between the plurality of particles 2010. From the result of EDX, silicon is detected in the line A-B across part of the particle 2010 region and part of the light gray region 2011. This indicates that the light gray region 2011 corresponds to the silicon oxide film. On the other hand, from the STEM image in FIG. 15B and the result of EDX in the line C-D, the silicon oxide film is not observed. Therefore, it is found that the silicon oxide film is not formed on the entire surface of the particles 2010, but formed on part of the surface of the particles 2010.

(CV Measurement)

Next, whether the silicon oxide film of Electrode 1 has an effect of suppressing decomposition of the electrolyte solution or not was examined by CV measurement.

For the CV measurement, a three-electrode cell was used, an electrode X was used as a working electrode, lithium was used for a reference electrode and a counter electrode, and a solution obtained by dissolving 1 mol/L of lithium hexafluorophosphate (LiPF$_6$) in a mixed solution of ethylene carbonate (EC) and diethyl carbonate (DEC) (volume ratio 1:1) was used as an electrolyte solution. The measurement was performed at a scan rate (the sweep rate in an electric field) of 4 μV/sec in the potential range of 0.01 V to 1 V (vs. Li/Li$^+$).

Figures 16A, 16B:
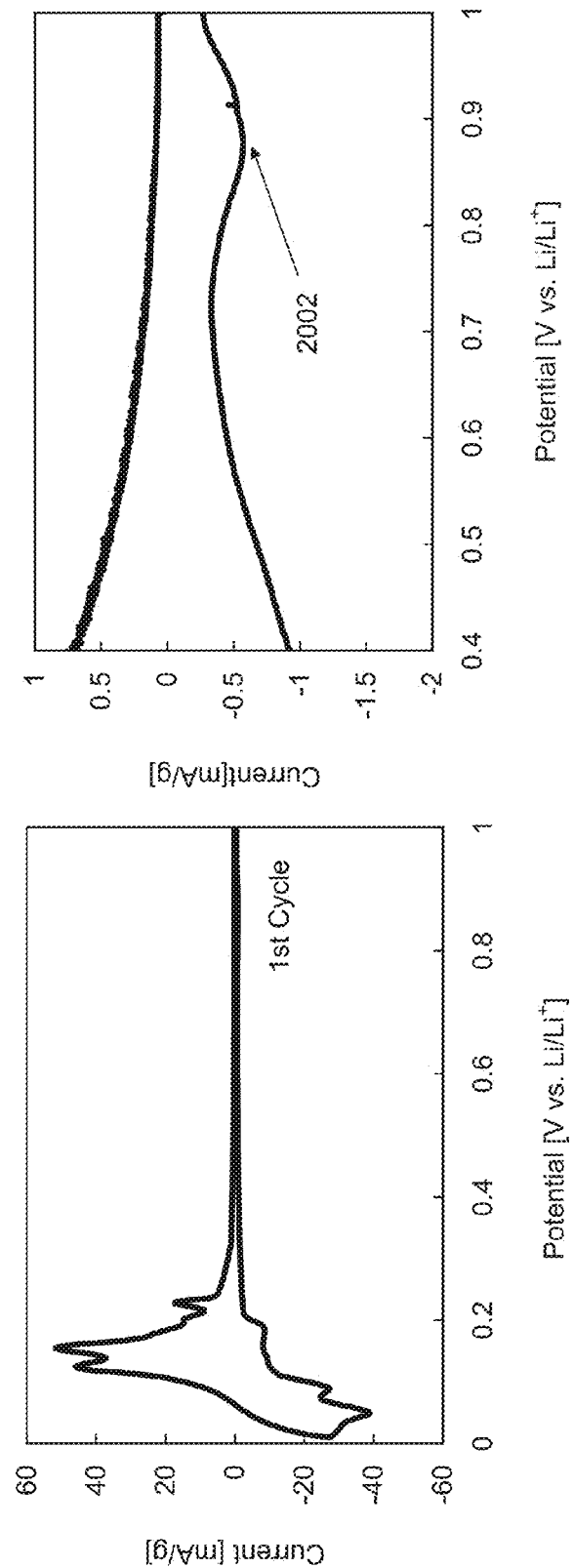
FIGS. 16A and 16B are graphs showing results of CV measurement.

FIGS. 16A and 16B show the results of CV measurement of one cycle. FIG. 16A shows the results of measurement in the scan range of 0.01 V to 1 V. FIG. 16B is a graph focused on potentials around 0.4 V to 1V.

In FIG. 16B, a peak 2002 appears in the range of 0.7 V to 1 V. This indicates decomposition of the electrolyte solution.

Figure 17B:
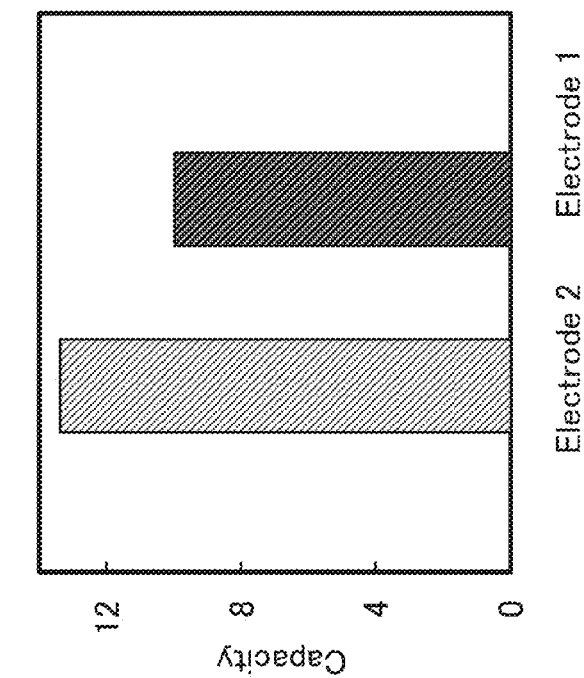
FIG. 17B is a graph showing the capacity of decomposition of an electrolyte solution.
Figure 17A:
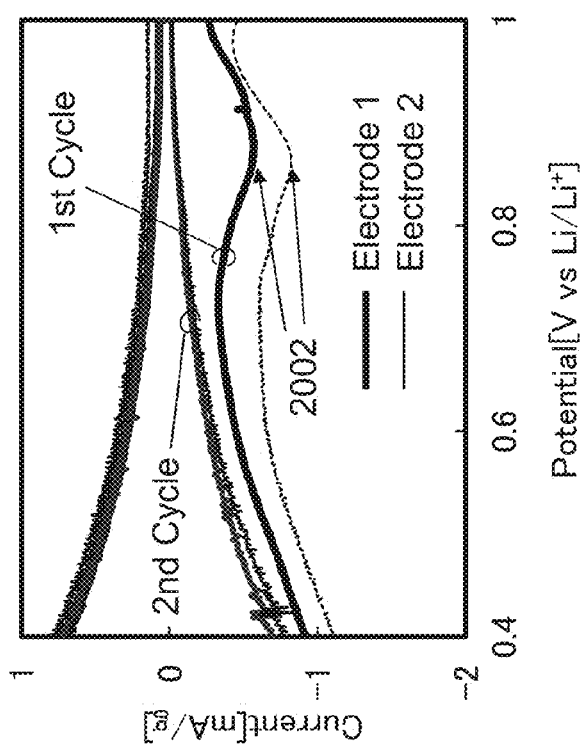
FIG. 17A is a graph showing results of CV measurement.

For the comparison, Electrode 2 in which a silicon oxide film is not provided on a surface of graphite particles which are the same as the above-described graphite particles was made, and CV measurement was performed for two cycles under the same conditions. FIGS. 17A and 17B show the results obtained by comparing a cell using Electrode 1 with a cell using Electrode 2. FIG. 17A is a cyclic voltammogram, and FIG. 17B is a graph showing the capacity of decomposition of the electrolyte solution, which is calculated on the basis of the results in FIG. 17A.

As shown in FIGS. 17A and 17B, the peak 2002 that appears in the range of 0.7 V to 1 V in the cell using Electrode 2 is higher than that in the cell using Electrode 1. Therefore, decomposition of the electrolyte solution can be suppressed by providing a silicon oxide film.

(Cycle Performance Evaluation) A negative electrode X and a negative electrode Y were formed. In the negative electrode X, graphite particles provided with a silicon oxide film, which is formed by the above-mentioned sol-gel method, are used as negative electrode active materials. In the negative electrode Y, graphite particles provided with a silicon oxide film, which is formed by the above-mentioned polysilazane method, are used as negative electrode active materials. A cell using LiFePO$_4$ as a positive electrode and the negative electrode X and a cell using LiFePO$_4$ as a positive electrode and the negative electrode Y were formed, and the cycle performance of the cells were compared with each other.

The negative electrode X using a sol-gel method was made in a manner similar to that of Electrode 1.

In the formation of the negative electrode Y using a polysilazane method, 5 g of graphite produced by JFE Chemical Corporation and 2.5 ml of toluene were mixed in a dry room; 1.3 mg of a xylene solution containing 20 wt % perhydropolysilazane was added thereto; and the mixture was further mixed in the dry room. The mixture was kept in the air for 30 minutes, subjected to heat treatment with a hot plate in the air at 150° C. for one hour, and dried with a glass tube oven at 170° C. for 10 hours. Thus, an electrode material including graphite particles provided with a silicon oxide film was formed. In addition, slurry formed by mixing the electrode material, acetylene black, and PVDF was applied onto a current collector of copper with a thickness of 18 μm and dried. At this time, the weight ratio of PVDF to graphite was 10 wt % (weight percent).

Note that the negative electrode X and the negative electrode Y were made such that the weight ratio of the silicon oxide film to the graphite particles was 1 wt % (weight percent).

The performance was measured using coin cells. An electrolyte solution formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 1:1 was used. As the separator, polypropylene (PP) was used. Charge and discharge were performed at a rate of 1 C (it takes 1 hour for charging), voltages ranging from 2 V to 4 V, and an environment temperature of 60° C. Under such conditions, the measurement was performed.

The cycle performance evaluation was performed on a secondary battery using the negative electrode X, a secondary battery using the negative electrode Y, and a secondary battery using a negative electrode Z. The negative electrode Z was made for comparison, in which graphite particles which are not provided with the coating film are used as negative electrode active materials.

Figure 18:
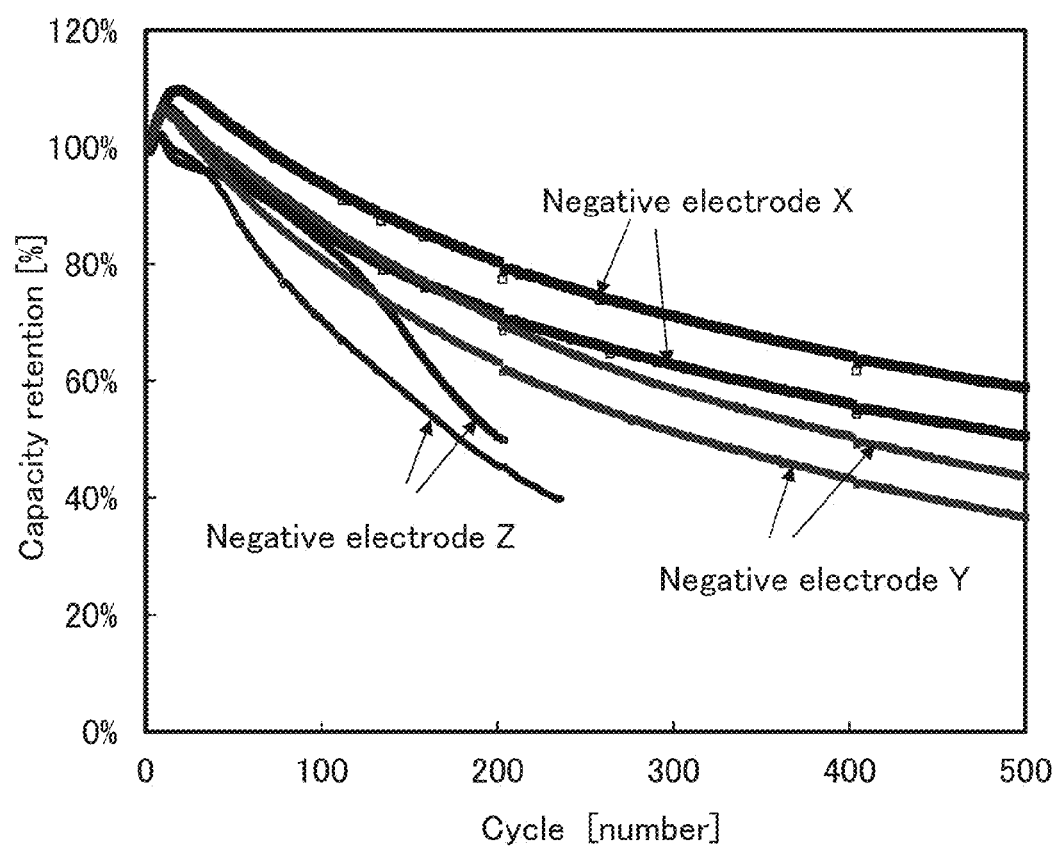
FIG. 18 is a graph showing cycle performance.

FIG. 18 shows the results of the cycle performance evaluation. The horizontal axis represents the number of cycles (times) and the vertical axis represents capacity retention (%) of the secondary batteries. The number of measured samples of each of the secondary battery using the negative electrode X, the secondary battery using the negative electrode Y, and the secondary battery using the negative electrode Z was two (n=2).

FIG. 18 shows that as the number of cycles increases, the discharge capacities of the secondary batteries using the negative electrode X and secondary batteries using the negative electrode Y are less likely to decrease than those of the secondary batteries using the negative electrode Z at 60° C. For example, after 500 cycles of charge and discharge, the capacity of the secondary battery using the negative electrode X is higher than or equal to 60% of the initial capacity. Thus, decomposition reaction of the electrolyte solution, which speeds up at high temperature, is suppressed and a decrease in capacity in charge and discharge at high temperature is suppressed, so that the operating temperature range of a power storage device can be extended.

The decrease in discharge capacity of the secondary battery using the negative electrode X is smaller than the decrease in discharge capacity of the secondary battery using the negative electrode Y. A net-like structure is less likely formed on the negative electrode active material produced by a polysilazane method as compared with on the negative electrode active material produced by a sol-gel method. This is because Si(OH) is needed for forming the net-like structure, and the amount of Si(OH) generated by the method of producing the electrode material using a polysilazane method is smaller than the amount of Si(OH) generated by the method of producing the electrode material using a sol-gel method. Therefore, formation of the net-like structure leads to improvement in cycle performance and reliability of a power storage device and.

This application is based on Japanese Patent Application Ser. No. 2012-224581 filed with Japan Patent Office on Oct. 9, 2012, the entire contents of which are hereby incorporated by reference.

What is claimed is:

1. A material for an electrode of a power storage device comprising:
   a granular active material comprising a carbon atom; and
   a film having a net-like structure over the granular active material,
   wherein the net-like structure comprises a plurality of bonds between the carbon atom and one of a silicon atom and a metal atom through an oxygen atom, and
   wherein the film partly covers a surface of the granular active material so that the surface of the granular active material has a first region which is covered with the film, and a second region which is not covered with the film.

2. The material for an electrode of a power storage device according to claim 1,
wherein the granular active material comprises a graphite particle.

3. The material for an electrode of a power storage device according to claim 1,
wherein the metal atom is one of a niobium atom, a titanium atom, a vanadium atom, a tantalum atom, a tungsten atom, a zirconium atom, a molybdenum atom, a hafnium atom, a chromium atom, and an aluminum atom.

4. The material for an electrode of a power storage device according to claim 1, further comprising a plurality of oxide layers over the film,
wherein each of the plurality of oxide layers comprises a bond of the one of the silicon atom and the metal atom, and an oxygen atom.

5. A power storage device comprising a negative electrode, the negative electrode comprising the material for an electrode of a power storage device according to claim 1.

6. An electrical appliance comprising the power storage device according to claim 5.

7. A material for an electrode of a power storage device comprising:
a granular active material comprising a carbon atom; and
a film having a net-like structure over the granular active material,
wherein the net-like structure comprises a plurality of bonds between the carbon atom and a silicon atom through an oxygen atom, and
wherein the film partly covers a surface of the granular active material so that the surface of the granular active material has a first region which is covered with the film, and a second region which is not covered with the film.

8. The material for an electrode of a power storage device according to claim 7,
wherein the granular active material comprises a graphite particle.

9. The material for an electrode of a power storage device according to claim 7, further comprising a plurality of oxide layers over the film,
wherein each of the plurality of oxide layers comprises a bond of the silicon atom and an oxygen atom.

10. A power storage device comprising a negative electrode, the negative electrode comprising the material for an electrode of a power storage device according to claim 7.

11. An electrical appliance comprising the power storage device according to claim 10.

12. A material for an electrode of a power storage device comprising:
a granular active material comprising a carbon atom; and
a film having a net-like structure over the granular active material,
wherein the net-like structure comprises a plurality of bonds between the carbon atom and one of a silicon atom and a metal atom through an oxygen atom,
wherein the granular active material comprises a plurality of graphene layers,
wherein the film partly covers a surface of the granular active material so that the surface of the granular active material has a first region which is covered with the film, and a second region which is not covered with the film, and
wherein the net-like structure exists at end portions of part of the plurality of graphene layers.

13. The material for an electrode of a power storage device according to claim 12,
wherein the metal atom is one of a niobium atom, a titanium atom, a vanadium atom, a tantalum atom, a tungsten atom, a zirconium atom, a molybdenum atom, a hafnium atom, a chromium atom, and an aluminum atom.

14. The material for an electrode of a power storage device according to claim 12, further comprising a plurality of oxide layers over the film,
wherein each of the plurality of oxide layers comprises a bond of the one of the silicon atom and the metal atom, and an oxygen atom.

15. A power storage device comprising a negative electrode, the negative electrode comprising the material for an electrode of a power storage device according to claim 12.

16. An electrical appliance comprising the power storage device according to claim 15.

* * * * *